(12) United States Patent
Matsuyama

(10) Patent No.: US 6,415,653 B1
(45) Date of Patent: Jul. 9, 2002

(54) CANTILEVER FOR USE IN A SCANNING PROBE MICROSCOPE

(75) Inventor: Katsuhiro Matsuyama, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/273,216

(22) Filed: Mar. 19, 1999

(30) Foreign Application Priority Data

Mar. 24, 1998 (JP) ............................................ 10-075490
Mar. 24, 1998 (JP) ............................................ 10-075491
Mar. 24, 1998 (JP) ............................................ 10-075492

(51) Int. Cl.$^7$ .......................... G01B 5/28; H01L 21/465
(52) U.S. Cl. ........................... 73/105; 250/306; 216/2; 216/11
(58) Field of Search ............................ 73/105; 250/306, 250/307; 216/2, 11, 79, 99; 438/52

(56) References Cited

U.S. PATENT DOCUMENTS

| | | | |
|---|---|---|---|
| 5,021,364 A | * 6/1991 | Akamine et al. | ........... 250/306 |
| 5,051,379 A | 9/1991 | Bayer et al. | |
| 5,245,187 A | * 9/1993 | Kawase et al. | ............. 250/306 |
| 5,264,696 A | * 11/1993 | Toda | ........................... 250/306 |
| 5,319,961 A | * 6/1994 | Matsuyama et al. | .......... 73/105 |
| 5,367,165 A | * 11/1994 | Toda et al. | .................. 250/306 |
| 5,386,720 A | * 2/1995 | Toda et al. | .................... 73/105 |
| 5,399,232 A | 3/1995 | Albrecht et al. | |
| 5,811,017 A | * 9/1998 | Matsuyama | ................. 250/306 |
| 5,877,412 A | * 3/1999 | Muramatsu et al. | .......... 73/105 |

FOREIGN PATENT DOCUMENTS

| | | |
|---|---|---|
| JP | 5-340718 | 12/1993 |
| JP | 9-15250 | 1/1997 |

OTHER PUBLICATIONS

T.R. Albrecht et al; Atomic Resolution Imaging of a Non–Conductor by Atomic Force Microscopy; Oct. 1, 1987; pp. 2599–2602; J. Appl. Phys. 62 (7).

T.R. Albrecht et al; Microfabrication of Cantilever Styli For The Atomic Force Microscope; Jul./Aug. 1990; pp. 3386–3396; J. Vac. Sci. Technol. A8 (4).

O. Wolter et al; Micromachined Silicon Sensors for Scanning Force Microscopy; Mar./Apr. 1991; pp. 1353–1357; J. Vac. Sci. Technol. B9 (2).

* cited by examiner

Primary Examiner—Daniel S. Larkin
(74) Attorney, Agent, or Firm—Frishauf, Holtz, Goodman & Chick, P.C.

(57) ABSTRACT

A cantilever for use in a scanning probe microscope includes a lever portion having a probe portion made from a semiconductor substrate. The length and thickness directions of the lever portion are parallel to a top surface of the semiconductor substrate, and a width direction of the lever portion corresponds to a thickness direction of the semiconductor substrate. The probe portion is triangular or substantially triangular pyramid shaped having three faces, two of which are made of crystal and a remaining one of which is formed by an artificial process.

8 Claims, 13 Drawing Sheets

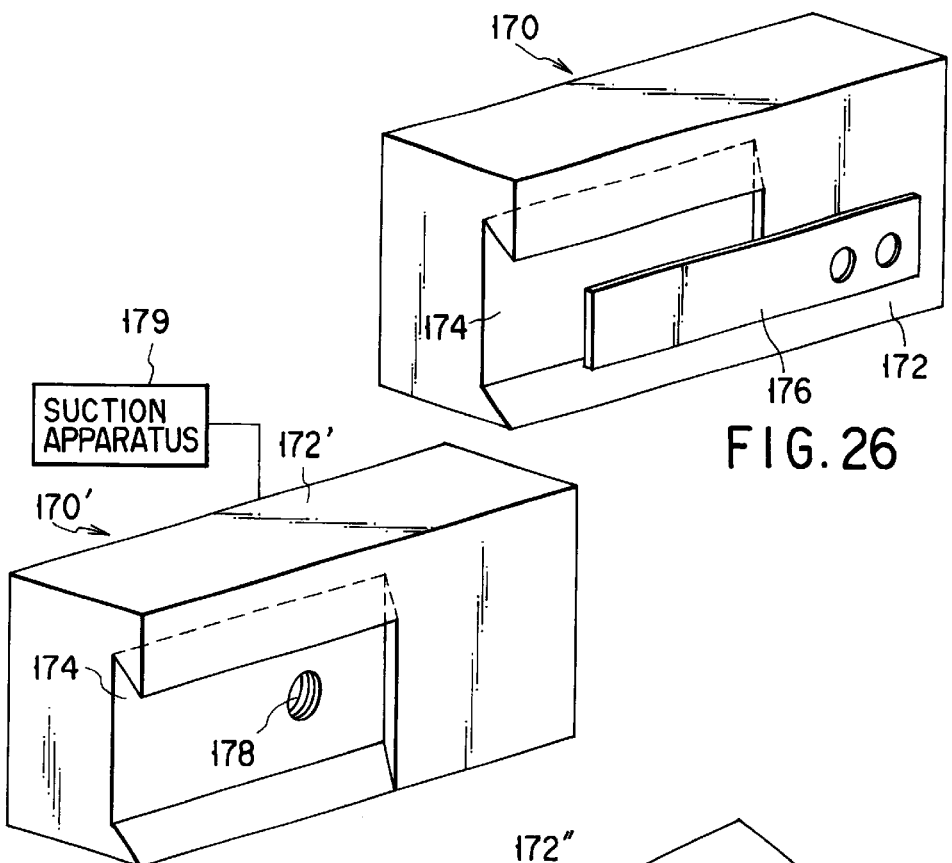
FIG. 26
FIG. 27
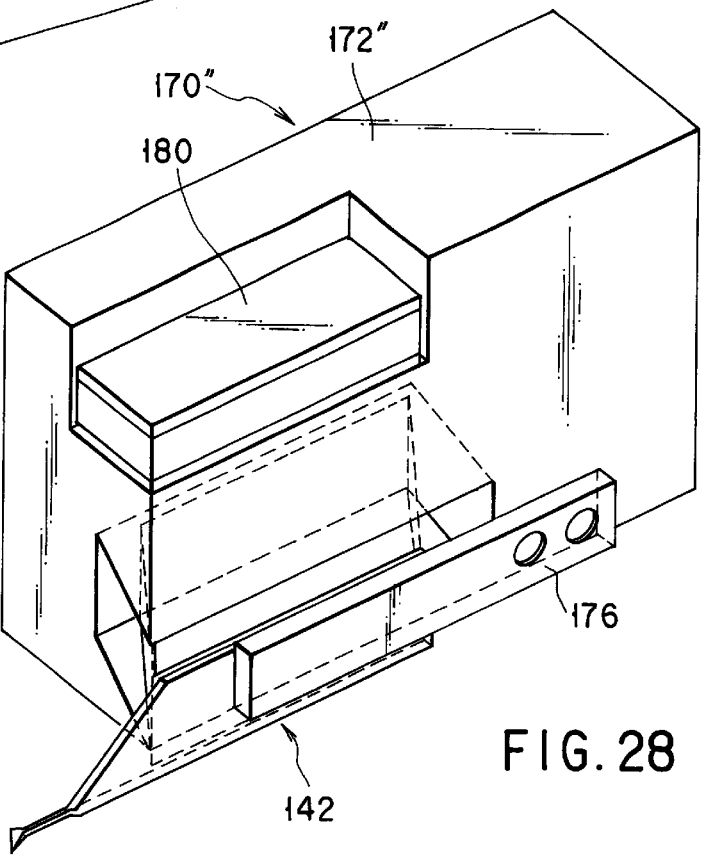
FIG. 28

CANTILEVER FOR USE IN A SCANNING PROBE MICROSCOPE

BACKGROUND OF THE INVENTION

A scanning probe microscope (SPM) is an apparatus for performing three-dimensional mapping of an interaction (atomic force, contact force, etc.) between a probe and a sample surface by scanning the probe or the sample in the XY or XYZ directions, while detecting the interaction between the probe and the sample surface, when they are in close proximity or contact to each other. SPM is the general term for a scanning tunneling microscope (STM), an atomic force microscope (AFM), a magnetic force microscope (MFM), and a scanning near-field optical microscope (SNOM). In particular, the AFM is most widely used of all the SPMs as an apparatus for obtaining information on configuration on a sample surface.

The AFM comprises a cantilever including a lever portion, a free end of which has a sharp projection (a probe having a sharp point), and the other end of which is fixed. The cantilever is brought into close proximity to a sample, such that the tip of the probe faces the surface of the sample. While the sample or the cantilever is scanned in the XY directions, the amount of displacement of the probe and the amount of elastic deformation (flexibility) of the lever portion, which vary due to an interaction (atomic force, contact force, etc.) between atoms at the tip of the probe and on the surface of the sample, are electrically or optically detected and measured. Thus, information on the sample, e.g., configuration, is detected three-dimensionally by relatively changing the positional relationship between the probe of the cantilever and the sample.

A method for detecting an amount of elastic deformation (flexibility) of the lever portion of an SPM is disclosed in, for example, Jpn. Pat. Appln. KOKAI Publications Nos. 5-340718 and 9-15250, the contents of which are incorporated herein by reference. The detection of the amount of flexibility of the lever portion, disclosed in these references, is performed by means of a known "displacement detecting sensor of an optical lever system". In connection with the detection of the amount of flexibility of the lever portion, "a method for detecting defocus by means of a critical angle prism", "a displacement detecting sensor utilizing an optical interferometer", etc. are also known.

The SPM measurement by means of the displacement detecting sensor is performed as follows. A probe is scanned over a measurement region of a sample in the XY directions. The amount of flexibility of the lever portion in the measurement region is detected by the displacement detecting sensor whenever necessary. The detected amount of flexibility is imaged at resolution of an atomic level as sample information, such as configuration or magnetic power of the surface of the sample, and displayed on a monitor.

Cantilevers used in such an SPM have been mainly produced by an applied semiconductor IC manufacturing process, since the process was proposed, as disclosed in Thomas R. Albrecht and Calvin F. Quate, "Atomic Resolution Imaging of a Nonconductor by Atomic Force Microscopy", J. Appl. Phys. 62 (1987), page 2599. This is because the process allows a cantilever to be produced with high accuracy in the order of microns at low cost by using a batch process.

The cantilevers on the market now include the following two types: cantilevers made of silicon nitride; and cantilevers made of silicon. The mainstream of the silicon nitride cantilevers is described in Thomas R. Albrecht et al., "Microfabrication of Cantilever Styli for the Atomic Force Microscope", J. Vac. Sci. Technol. A8, 3386 (1990). A detailed method for fabricating this type of cantilever is disclosed in U.S. Pat. No. 5,399,232, the contents of which are incorporated herein by reference. The mainstream of the silicon cantilevers is described in O. Wolter et al., "Micromachined Silicon Sensors for Scanning Force Microscopy", J. Vac. Sci. Technol. B9, 1353 (1991). A detailed method for fabricating this type of cantilever is disclosed in U.S. Pat. No. 5,051,379, the contents of which are incorporated herein by reference.

[Problem 1A]

To fabricate a silicon nitride cantilever, first, a lever base material of silicon nitride and a supporting portion to be attached to an apparatus are produced separately, and then the two parts are adhered by anode adhesion or the like. The portion of the lever base material, which is not adhered to the supporting portion, functions as a lever portion.

Therefore, the length of the lever portion varies depending on accuracy of the adhesion between the lever base material and the supporting portion. The anode adhesion causes variance of about 10–30 $\mu$m in length of the portion where the lever base material adheres to the supporting portion. Accordingly, variance in length of the lever portion is about 10–30 $\mu$m in the silicon nitride cantilever.

To fabricate a silicon cantilever, a lever portion is formed by dry etching from one side of a silicon wafer, and a supporting portion made of silicon is formed by wet anisotropic etching from the other side on which the lever portion is not formed.

The length of the lever portion depends on the thickness of the silicon wafer, and displacement of a lever portion forming mask and a supporting portion forming mask formed on both sides of the silicon wafer. In general, variance in thickness of silicon wafers available on the market is at least 10 $\mu$m. Further, the displacement of the aforementioned masks formed on both sides of a silicon wafer is about 10 to 20 $\mu$m. Consequently, variance in length of the lever portion is about 10 to 30 $\mu$m in the silicon cantilever.

Moreover, in the silicon cantilever, variance in thickness of each of the silicon wafers is directly reflected in the thickness of the lever portion. Therefore, in the silicon cantilever, variance in thickness of the lever portion is about 1 $\mu$m.

In the cantilevers used in the SPM measurement, it is necessary that the spring constant of the lever portion be known. Further, in the cantilevers used in the SPM measurement in an oscillation mode for oscillating the cantilever, it is necessary that the resonance frequency, as well as the spring constant, of the lever portion be known. To obtain an accurate result of SPM measurement, it is desirable that variance in both the spring constant and the resonance frequency be little.

The frequency resonance of the lever portion of the cantilever is inversely proportional to the square of the length of the lever portion and proportional to the thickness thereof. The spring constant is inversely proportional to the cube of the length and proportional to the thickness. Therefore, to obtain a cantilever of little variance in the spring constant and the resonance frequency, it is necessary that the length and thickness of the lever portion be deviated as little as possible from the design values. In other words, a technique for forming a lever portion with high accuracy, in respect of the length and thickness, is required.

[Problem 1B]

Recently, an SPM, wherein the sample is raster-scanned at high speed of more than one screen per second, has been widely used by trial for observing microscopic movement of, for example, a biological sample. Further, the SPM technique has been also put to trial for high-density recording. Under these situations, there is a demand for a probe device shaped like a cantilever having a high resonance frequency in order to increase the input and output speeds.

The cantilever used for the SPM measurement at high-speed scanning is required to have a resonance frequency in the order of MHz or higher to increase the scanning speed. Further, the spring constant is required to be 40–50 N/m or smaller to prevent breakage of the probe or the sample in a case of contact therebetween.

In the conventional cantilever generally used in the SPM measurement, a resonance frequency is about 300 kHz, a spring constant is about 20–50 N/m, and a length of the lever portion is 100–200 $\mu$m. Therefore, such a cantilever is not suitable for the resent SPM measurement using high-speed scanning.

As described above, the frequency resonance of the lever portion of the cantilever is inversely proportional to the square of the length of the lever portion and proportional to the thickness thereof, and the spring constant is inversely proportional to the cube of the length and proportional to the thickness. Therefore, to obtain a lever portion with a small spring constant and a high resonance frequency, it is necessary that the lever portion be short and thin.

For example, to realize a resonance frequency of 1 MHz with the same spring constant as that of a conventional silicon cantilever, which has a lever portion having a length of 120 $\mu$m and a thickness of 3 $\mu$m, the length of the lever portion must be 40 $\mu$m or less, and the thickness thereof must be 1 $\mu$m or less.

However, according to the conventional fabrication method as described above, the length of the lever portion inevitably varies between about 10 and 30 $\mu$m. Therefore, it is substantially impossible to stably fabricate a cantilever with a lever portion of a length of 40 $\mu$m or less.

Further, according to the conventional method for fabricating a silicon cantilever, variance in thickness of each of silicon wafers is reflected in the thickness of the lever portion. Since each of the silicon wafers has variance in thickness of 1 $\mu$m or more, it is substantially impossible to stably fabricate a cantilever with a lever portion of a thickness of 1 $\mu$m or less.

[Problem 2]

In the SPM measurement, one of the factors of determining the resolution of the measurement result is the aspect ratio, i.e., the sharpness of the probe of the cantilever used in the measurement, in particular, the tip of the probe. In other words, the resolution of the SPM measurement is greatly influenced by the sharpness of the probe used in the measurement. Therefore, it is desirable that the probe of the cantilever have a sharp tip.

The SPM has been widely used in various fields. At the beginning, it was mainly used to measure the roughness of a comparatively flat sample. Recently, however, it is used to measure a sample which has a large difference in level or a narrow groove. It is also used to measure a vertical wall in connection with the measurement of such a sample. In the recent SPM measurement, it is desirable that the probe of the cantilever be long and thin and the tip of the probe be sharp.

To form a lever portion of the silicon nitride cantilever described above, a silicon nitride film is formed on a silicon wafer in which an inverted pyramidal hole is formed. After the silicon nitride film is patterned, the silicon wafer is removed, so that a lever portion having a probe is formed. Therefore, the probe has a pyramidal projection formed of the silicon nitride deposited on the surfaces of the inverted pyramidal hole.

The inverted pyramidal hole is formed by processing a (100) oriented silicon wafer by wet anisotropic etching, using a mask which has a square opening. The hole of the inverted pyramidal hole thus formed is defined by four (111) planes of silicon.

Since the (111) plane is inclined at an angle of 54.7° with respect to the (100) plane and the lever portion is formed of the silicon nitride film deposited on the (100) plane, the four side faces of the probe are all inclined at the angle of 54.7° with respect to the (100) plane. Therefore, the vertex angle of the pyramidal probe of the silicon nitride cantilever is about 70°.

The silicon cantilever described before has a probe having a vertex angle of about 45°. Further, the following method for fabricating a silicon cantilever is recently produced. A triangular step is formed in a (100) oriented silicon wafer, such that the perpendicular from the vertex extends along the <110> direction. The side surface of the step is oxidized to form an oxide film wall perpendicular to the (100) plane. Thereafter, the wafer is processed by wet anisotropic etching, thereby forming a lever portion having a probe at its top end.

The lever portion is formed of a portion of the triangular step which is etched in parallel with the (100) plane. The probe is formed of a triangular pyramid remaining at a top end portion of the triangular step. The side faces of the triangular probe are defined by two sides of the top end portion of the triangular step and a (111) plane of silicon exposed by the wet anisotropic etching.

As described before, since the (111) plane is inclined at an angle of 54.7° with respect to the (100) plane, and the surface of the lever portion is constituted by the (100) plane, the side face of the probe constituted by the (100) plane is inclined at the angle of 54.7° with respect to the lever surface. Therefore, the vertex angle of the pyramidal probe of the silicon cantilever is about 35°.

As can be understood from the above description, both in the silicon nitride cantilever and the silicon cantilever, the surface of the lever portion is formed of the (100) plane of silicon and at least one of the side faces of the probe is formed of the (111) plane of silicon. Therefore, according to the conventional methods, it is impossible to form a cantilever having a probe, all side faces of which are inclined at an angle greater than 54.7° with the surface of the lever portion.

[Problem 3]

In the cantilevers produced by applying the process of manufacturing semiconductor ICs, the supporting portion supporting the lever portion has an attachment surface parallel to the surface of the lever portion. The cantilever is fixed to the SPM apparatus by attaching the attachment surface to the apparatus and pressed thereon by a fixing device, such as a spring.

The fixing device for pressing the supporting portion of the cantilever is arranged in a lower portion of the SPM apparatus in accordance with the shape of the cantilever. To avoid contact between the fixing device and a sample to be measured, the cantilever is attached so that the surface of the lever portion is inclined with respect to the surface of the sample.

However, the space obtained by attaching the cantilever obliquely is little, and contact between the fixing device and the sample cannot be completely avoided. Further, as the cantilever has become compact, the space obtained by attaching the cantilever obliquely becomes less. Therefore, it has been more difficult to avoid contact between the fixing device and the sample.

BRIEF SUMMARY OF THE INVENTION

According to an aspect, the present invention was made to solve the aforementioned problems 1A and 1B. An object of the present invention is to provide a method for stably fabricating a cantilever having little variance in length and thickness of the lever portion. Another object of the present invention is to provide a method for constantly fabricating a cantilever including a lever portion which has a resonance frequency in the order of MHz and a spring constant of 40–50 N/m or smaller.

According to another aspect, the present invention was made to solve the aforementioned problem 2. An object of the present invention is to provide a cantilever having a sharp probe. Another object of the present invention is to provide a cantilever having a long probe.

According to still another aspect, the present invention was made to solve the aforementioned problem 3. An object of the present invention is to provide a cantilever and a mechanism for holding the same, which easily prevents contact between a supporting portion of the cantilever and a sample to be measured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 12A to 12C show a process of forming a lever portion according to the method of fabricating a cantilever shown in FIGS. 1 to 10, wherein FIG. 12A is a schematic cross-sectional view of the lever base portion in the step shown in FIG. 4, FIG. 12B is a schematic cross-sectional view of the lever base portion in the step shown in FIG. 5, and FIG. 12C is a schematic cross-sectional view of the lever base portion in the step shown in FIG. 7;

FIGS. 22A and 22B show a probe finally formed by subjecting the probe base portion shown in FIG. 20 to a low-temperature thermal oxidation process, wherein FIG. 22B is an enlarged view of a tip portion of the probe enclosed with a circle XXB shown in FIG. 22A;

FIG. 26 shows a cantilever holding mechanism for holding the cantilever shown in FIGS. 23 to 25;

FIG. 27 shows another cantilever holding mechanism for holding the cantilever shown in FIGS. 23 to 25;

FIG. 28 shows still another cantilever holding mechanism for holding the cantilever shown in FIGS. 23 to 25, wherein the mechanism has a function of vibrating the lever portion of the cantilever;

DETAILED DESCRIPTION OF THE INVENTION

A method for fabricating a cantilever for use in a scanning probe microscope (SPM) of the present invention will be described with reference to FIGS. 1 to 10.

Figure 1:
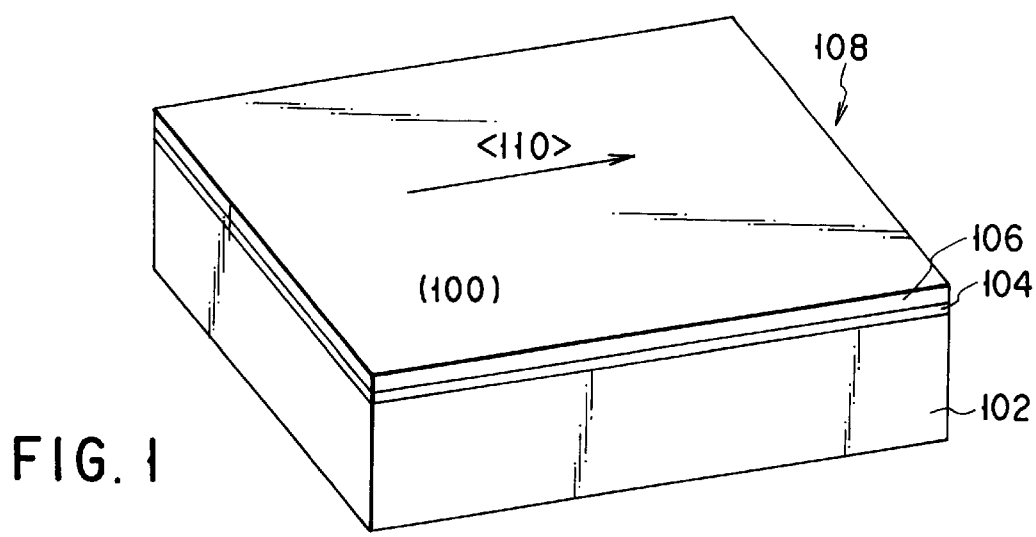
FIGS. 1 to 10 show sequential steps of a method for fabricating a cantilever according to an embodiment of the present invention, wherein FIG. 10 schematically shows a cantilever obtained as a finished product through the steps shown in FIGS. 1 to 9.

First, as shown in FIG. 1, a so-called laminated SOI (Silicon On Insulator) substrate 108 is prepared. The laminated SOI substrate 108 is manufactured, for example, as follows: first, an intermediate silicon oxide film 104 is formed on a first silicon substrate 102 made of (100) oriented single crystal silicon; and then a second silicon substrate 106, serving as an active layer, made of (100) oriented single crystal silicon is laminated thereon. For example, the first silicon substrate 102 is 500 μm thick, the intermediate silicon oxide film 104 is 1 μm thick, and the second silicon substrate 106 is 20 μm thick.

Figure 2:
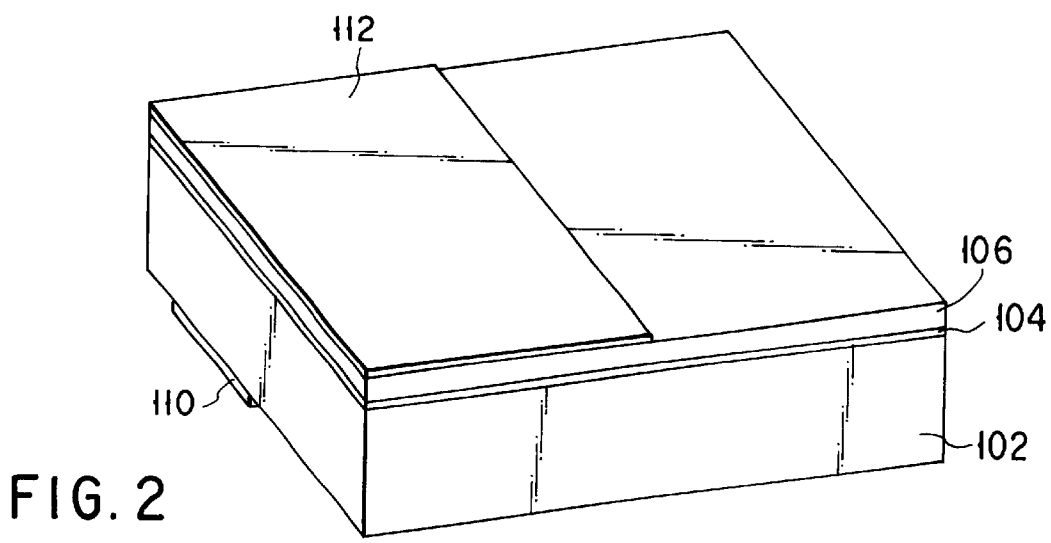

Then, as shown in FIG. 2, an etching mask 110 for use in forming a second supporting portion (to be described later) is formed on the bottom surface of the first silicon substrate 102 by patterning a silicon oxide or silicon nitride film. Similarly, an etching mask 112 for use in determining the width of a lever portion is formed on the top surface of the second silicon substrate 106 by patterning a silicon oxide or silicon nitride film.

Figure 3:
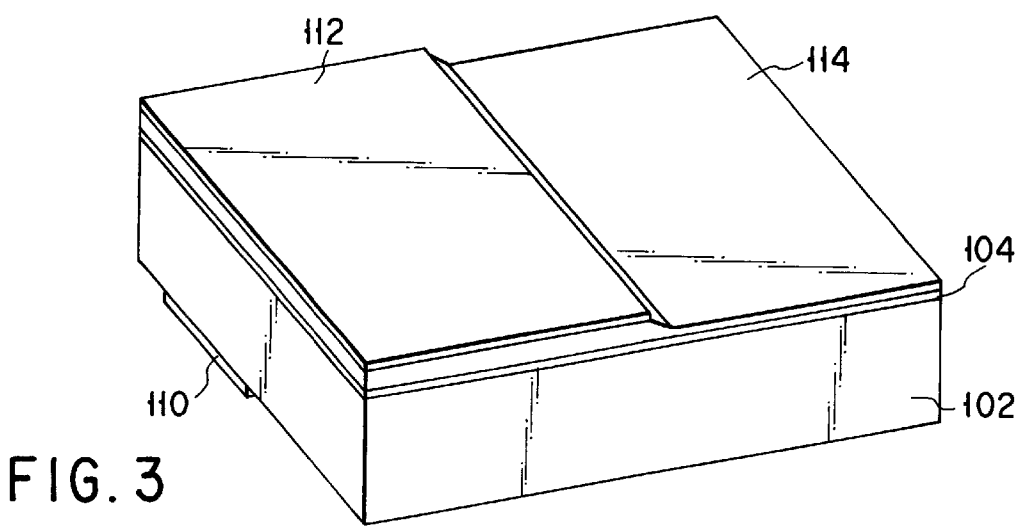

As shown in FIG. 3, the second silicon substrate 106 is processed by wet anisotropic etching, so that the thickness of a portion 114, which forms a lever portion later, is determined. The thickness of the lever forming portion 114 corresponds to the width of the lever portion. In this embodiment, the thickness is set to 5 μm.

In the case where the design value of the width of the lever portion is substantially equal to the thickness of the second silicon substrate 106 of the laminated SOI substrate 108, the steps shown in FIGS. 2 and 3 may be omitted.

Figure 4:
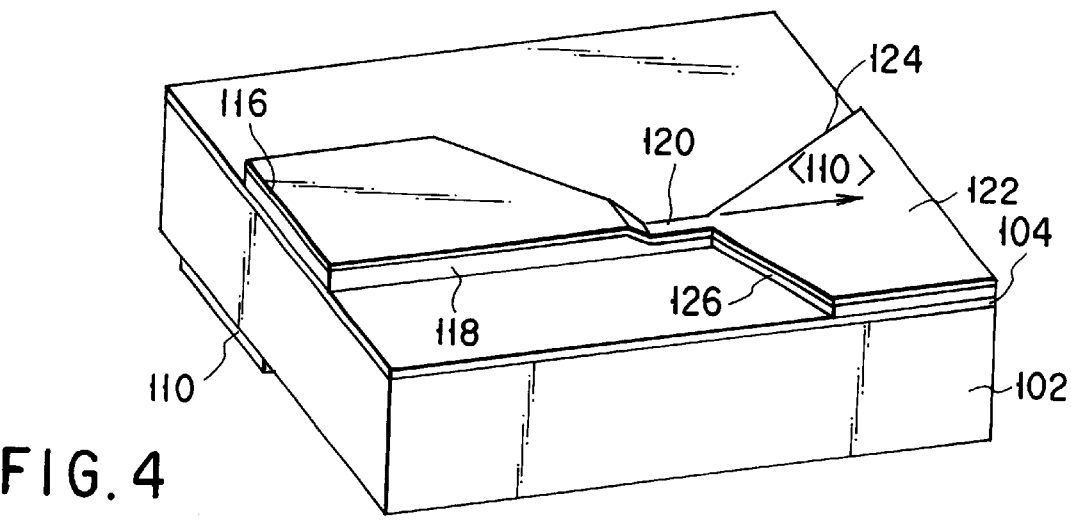

The silicon nitride film 116 formed on the top surface of the second silicon substrate 106 is patterned by photolithography and dry etching processes, as shown in FIG. 4. Thereafter, the second silicon substrate (active layer) is selectively removed, using the patterned silicon nitride film 116 as a mask, until the intermediate silicon oxide film 104 of the SOI substrate is exposed, thereby forming a first supporting portion 118, a lever base portion 120, i.e., the base material of a lever portion, and a probe forming portion 122, i.e., the base material of a probe.

The width (lateral dimension) of the lever base portion 120 is determined by pattern formation of the photolithography. In this embodiment, the second silicon substrate 106 is etched such that the lever base portion 120 has a width of 2 μm. The length of the lever base portion 120 is set to 17 μm in consideration of the shape of the lever portion to be formed later. An etching surface 124 of the probe forming portion 122 has some inclination from the <110> direction. An angle, which an etching surface 126 of the probe forming portion 122 forms with the <110> direction, determines the height of the probe, i.e., the aspect ratio. For example, about 70° is selected for a probe having a height of 10 μm.

Figure 5:
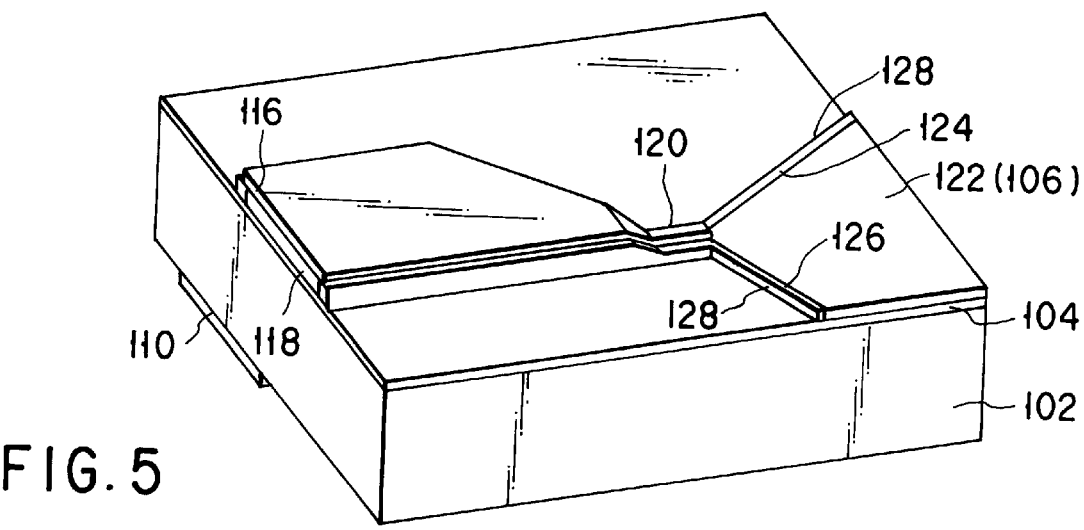

Then, as shown in FIG. 5, a wall 128 made of silicon oxide is formed by means of a thermal diffusion furnace on side surfaces of the second silicon substrate 106 in which the first supporting portion 118, the lever base portion 120 and the probe forming portion 122 are formed. Thereafter, the silicon nitride film 116 on the surface of the probe forming portion 122 is removed, thereby exposing the silicon 106.

Figure 6:
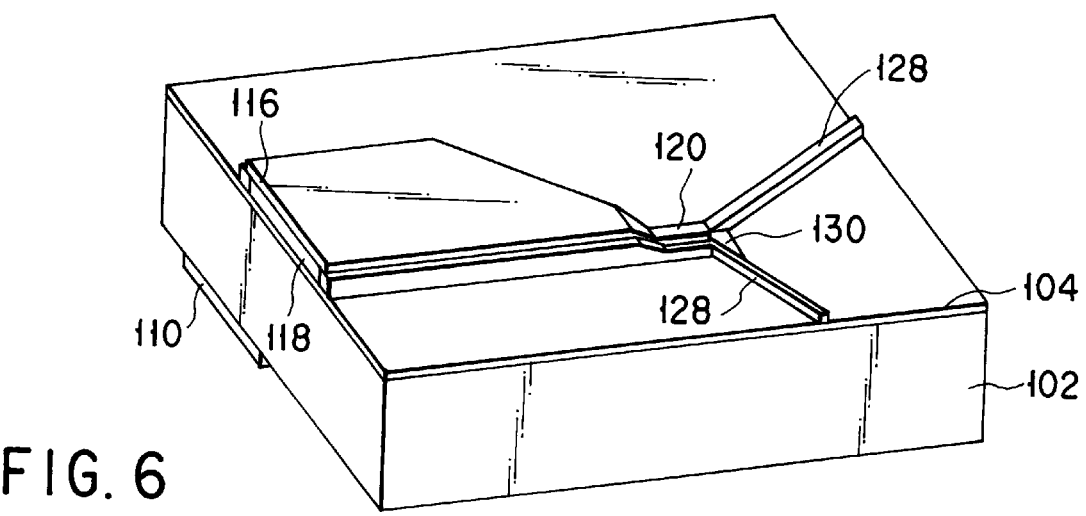

As shown in FIG. 6, the second silicon substrate 106 of the probe forming portion 122 is processed by wet anisotropic etching, until the intermediate silicon oxide film 104 is exposed, thereby forming a probe base portion 130 which has a triangular pyramidal shape similar to that of the probe of the cantilever. In the wet anisotropic etching, a water solution of potassium hydroxide (KOH) or tetramethyl ammonium hydroxide (TMAH) or ethylenediamine pirocatechol and water (EDP or EPW) may be used, for example.

In the wet anisotropic etching process of single crystal silicon, such as the second silicon substrate, the (111) plane is less etched as compared to the (100) plane of the silicon substrate. Therefore, the single crystal silicon is etched by wet anisotropic etching to expose the (111) plane from the end of the silicon nitride film 116 remaining in the lever base portion 120. The single crystal silicon of the remaining probe base portion 130 has a shape of a triangular pyramid comprising the three side faces: the exposed (111) plane, the (100) plane facing to the intermediate silicon oxide film 104, and the etching surface 126 defined by the wall 128 of the silicon oxide film. The probe base portion 130 is shaped into a probe in an oxidation process later.

Figure 7:
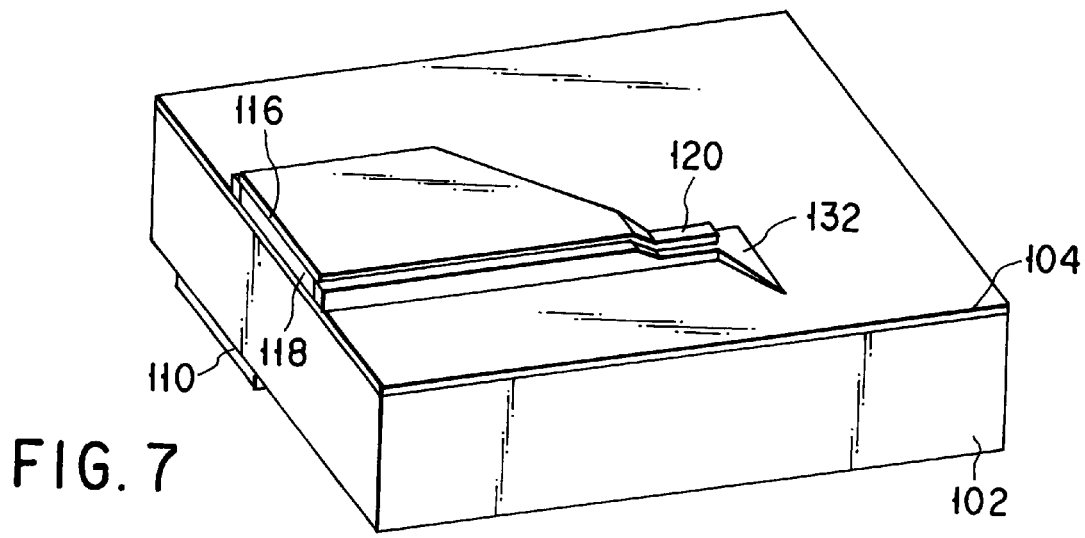

Then, as. shown in FIG. 7, a silicon oxide film 132 is formed by means of a thermal diffusion furnace on the surfaces of the triangular pyramidal probe base portion 130 and the lever base portion 120 (thermal oxidation). Referring to FIG. 7, the silicon oxide wall 128 has been removed before forming the silicon oxide film 132. However, the silicon oxide film 132 may be formed without removing the silicon oxide wall 128.

Figure 8:
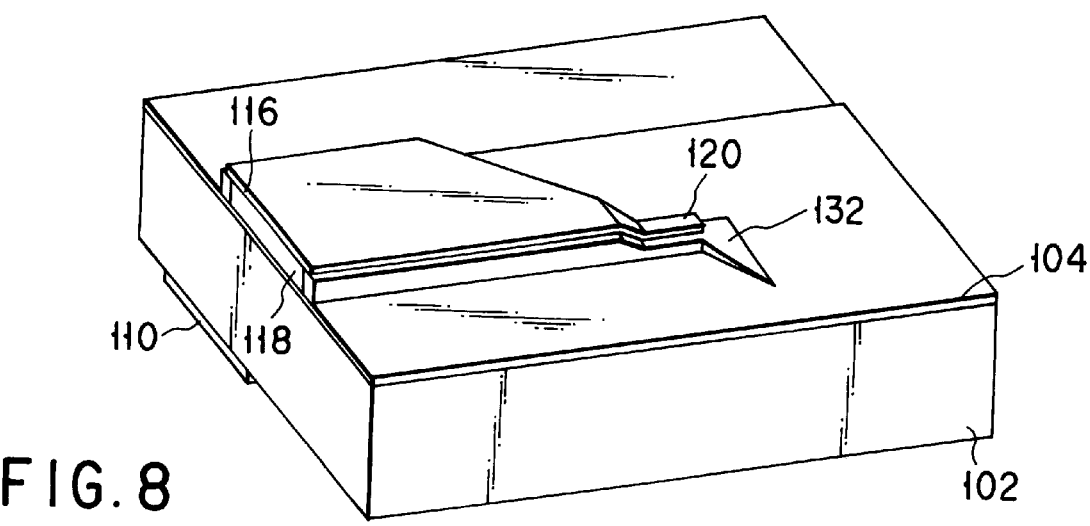

As shown in FIG. 8, a part of the intermediate silicon oxide film 104 on the side of the second silicon substrate 106 is removed, thereby forming an etching pattern for use in forming a second supporting portion described below.

Figure 9:
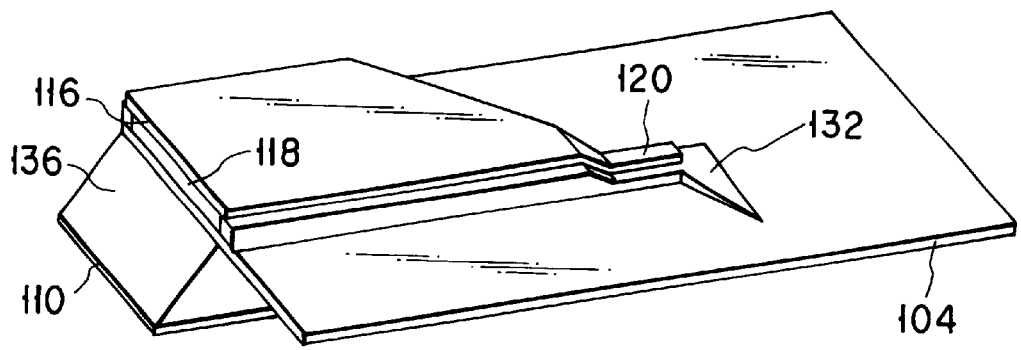

Subsequently, as shown in FIG. 9, the top and bottom surfaces of the first silicon substrate 102 is processed by wet anisotropic etching, thereby forming a second supporting portion 136.

Figure 10:
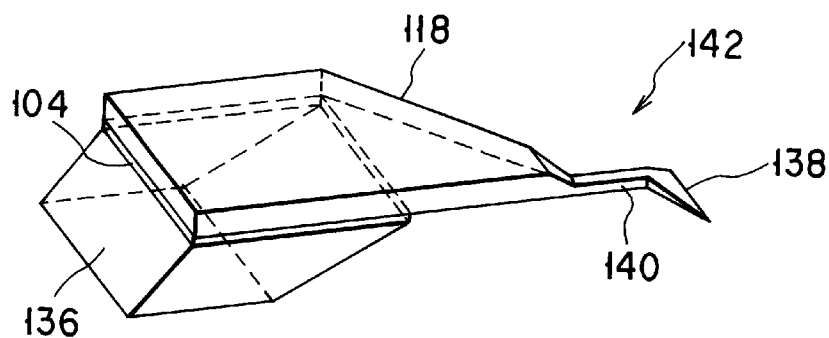

Finally, as shown in FIG. 10, all of the silicon nitride film and the silicon oxide film except for the intermediate silicon oxide film 104 sandwiched between the first supporting portion 118 and the second supporting portion 136, is removed by a water solution of heat phosphoric acid or hydrogen fluoride. As a result, a finished product, a cantilever 142, is obtained.

The cantilever 142 includes a lever portion 140 having a thickness of 0.4 μm, a length of 20 μm, and a width of 5 μm, and a probe having a height of about 10 μm, a resonance frequency of 1.4 MHz, and a spring constant of 1.7 N/m.

Figure 11:
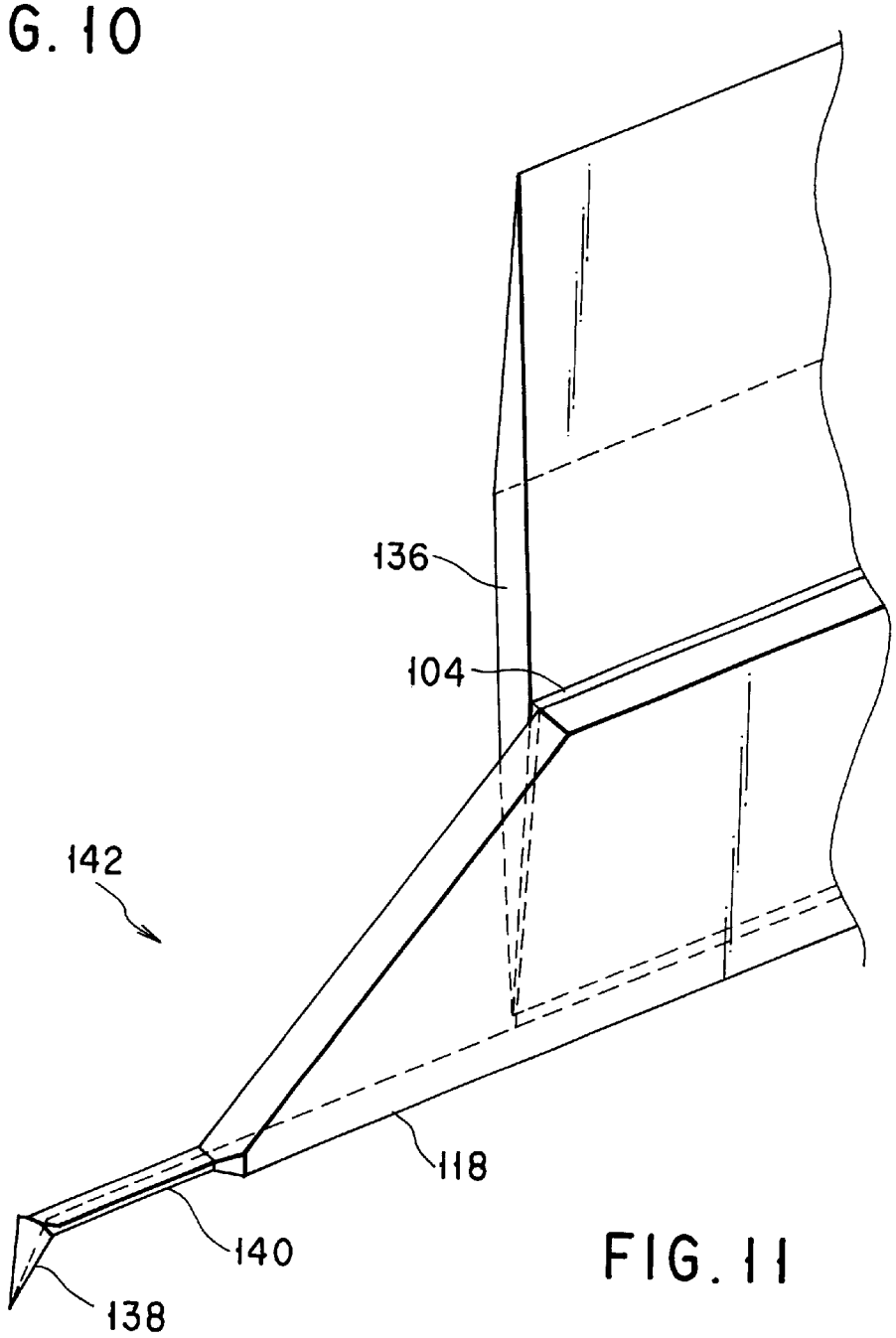
FIG. 11 shows a cantilever obtained by modifying the patterning of the silicon nitride film in the step shown in FIG. 4, wherein the cantilever is plane-symmetrical to the cantilever shown in FIG. 10.

According to the above method, the cantilever 142 as shown in FIG. 10 is formed, wherein the second supporting portion 136 is located on the left side of the lever portion 140 extending direction. However, a cantilever as shown in FIG. 11 may be formed, wherein the second supporting portion 136 is located on the right side of the lever portion extending direction, by modifying the patterning of the silicon nitride film 116 shown in FIG. 4.

The fabrication method of this embodiment can provide a cantilever suitable for high-speed scanning, wherein a sample is raster-scanned at high speed of more than one screen per second, as has been widely tried recently to observe microscopic movement of, for example, a biological sample.

In this specification, "a cantilever suitable for high-speed scanning" means a cantilever which has a resonance frequency in the order of MHz and a spring constant of 40–50 N/m or smaller to prevent breakage of the probe or the sample in a case of contact therebetween. In the cantilever which satisfies these conditions, the lever portion has, for example, a length of 40 μm or shorter and a thickness of 1 μm or thinner.

Conventionally, it was impossible to stably fabricate a lever portion having the above length and thickness. In contrast, according to the fabrication method of the present invention, since the length and thickness of the lever portion can be controlled stably, the cantilever suitable for high-speed scanning can be easily obtained.

A characteristic of the above embodiment is that a semiconductor substrate is selectively removed by means of a semiconductor process to fabricate a cantilever having a lever portion and a supporting portion. More specifically, the above embodiment is characterized in that a cantilever is fabricated by etching a semiconductor substrate in a width direction of a flat lever portion of the cantilever.

As shown in FIG. 10, the cantilever 142 fabricated by the method of this embodiment has the lever portion 140 made of rectangular single crystal silicon. A probe 138 shaped as a substantially triangular pyramid is formed at the free end of the lever portion 140. The lever portion 140 is supported by the first supporting portion 118, which is supported by the second supporting portion 136 via the intermediate silicon oxide film 104.

The lever portion 140 and the first supporting portion 118 are formed integrally as one piece by processing the second silicon substrate 106 by a semiconductor process. For this reason, the length of the lever portion 140 is determined depending on the wet etching process of the step shown in FIG. 3, the photolithography process of the step shown in FIG. 4 and the oxidation process of the step shown in FIG. 7. Therefore, variance in length of the lever portion 140 is suppressed to 1 μm or less, and under appropriate conditions, 100 nm or less. Consequently, a lever portion having a length of, for example, 10 μm can be obtained at variance of 10% or less.

The thickness of the lever portion 140 is determined depending on the photolithography and dry etching processes of the step shown in FIG. 4, the oxidation process of the step shown in FIG. 5 and the oxidation process of the step shown in FIG. 7. In other words, the thickness of the lever portion 140 is controlled by the three processes.

Figure 12A:
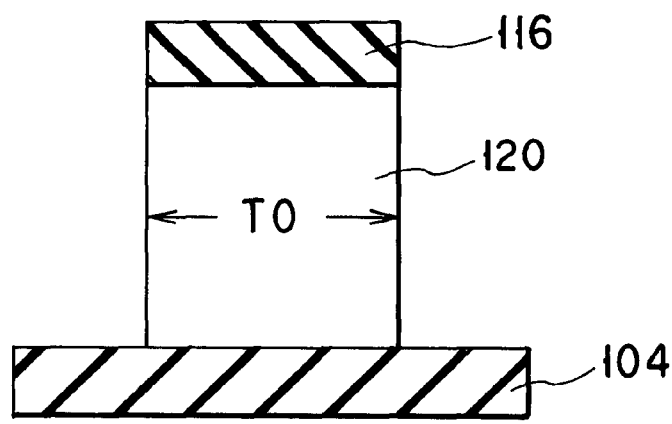

First, as shown in FIG. 12A, a first thickness T0 of the lever base portion 120 is determined by the photolithography and dry etching processes of the step shown in FIG. 4. The thickness T0 of the lever base portion 120 is, for example, 2 μm.

Figure 12B:
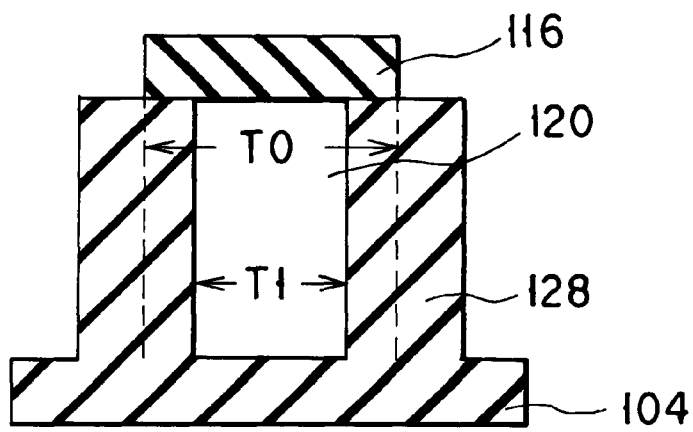

Thereafter, as shown in FIG. 12B, in the step of oxidizing silicon shown in FIG. 5, a part of silicon of the lever base portion 120 is oxidized to silicon oxide, with the result that the wall 128 of silicon oxide film is formed. Consequently, the thickness of the lever base portion 120 is reduced from T0 to T1. The thickness T1 of the lever base portion 120 is, for example, 1.2 μm.

Figure 12C:
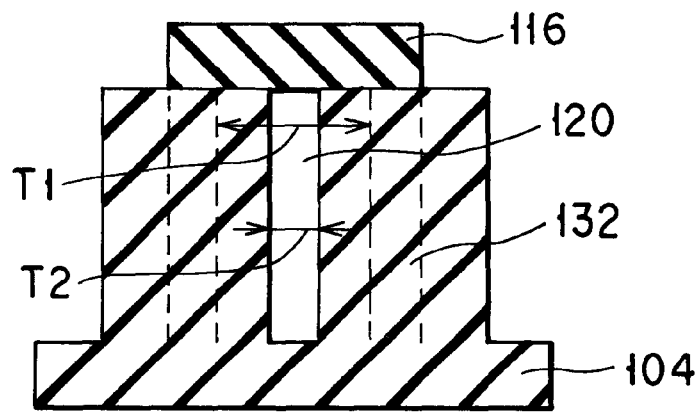

Finally, as shown in FIG. 12C, in the step of oxidizing silicon shown in FIG. 7, a part of the remaining silicon of the lever base portion 120 is oxidized, thereby forming the silicon oxide film 132. As a result, the thickness of the lever base portion 120 is reduced from T1 to T2. The lever base portion 120 obtained as a result of this step functions as the lever portion 140, after the silicon oxide film is removed. In other words, the lever portion 140 has a thickness T2. The thickness T2 of the lever portion 140 is, for example, 0.4 μm.

As described above, the lever base portion 120 is processed to a thickness (lateral dimension) of about 2 μm with high accuracy by the photolithography and dry etching. It is oxidized in the lateral direction, so that a final thickness of the lever portion 140 is determined. Since the progress of oxidation can be controlled with high accuracy, the lever portion 140 having a desired thickness, for example, 0.4 μm, can be formed accurately. Thus, the variance in thickness of the lever portion 140 depends on the patterning accuracy of photolithography and the controllability of oxidation of silicon, and can be suppressed to 100 nm or less, under appropriate conditions, 10 nm or less.

The dry etching used to form the lever base portion 120 is preferably RIE (Reactive Ion Etching) utilizing plasma, and more particularly, RIE using high anisotropy plasma and introduction gas, or ICP (Inductively Coupled Plasma) type RIE. These RIE methods are effective to control the shape of a cross section of the lever portion 140.

Further, the lever base portion 120 formed to have a predetermined thickness by the photolithography and dry etching is oxidized in the lateral direction, and the silicon oxide film obtained by the oxidation is removed, thereby forming the lever portion 140. Therefore, the lever portion of the cantilever can be thinner beyond the limit of the resolution of the photolithography.

According to the method described above, the lever portion 140 is stably fabricated to a desired shape with high accuracy. Therefore, the fabrication method provides a cantilever for use in an SPM, which has a resonance frequency and a spring constant adapted for various SPM measuring methods.

In particular, according to the above fabrication method, the lever portion 140 of the cantilever 142 can be short and thin. Such a cantilever is suitable for SPM measurement for high-speed scanning to observe, for example, a change with time of a sample to be measured.

Figure 15:
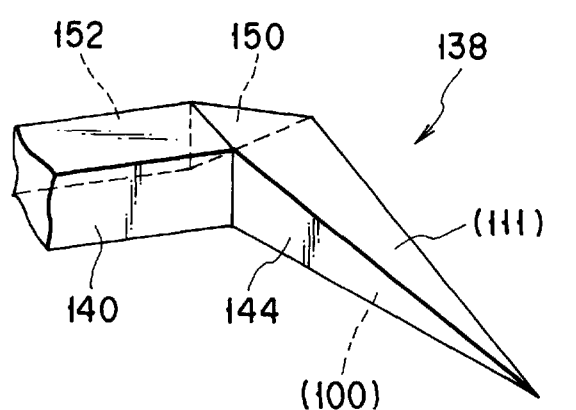
FIG. 15 shows a probe finally formed based on the probe base portion shown in FIG. 14.

Further, in the cantilever 142 fabricated by the method of this embodiment, the probe 138 has a triangular pyramidal tip portion as shown in FIG. 15. Two of the three side faces defining the tip portion are the (111) and (100) planes of silicon. The remaining side face 144 on the side of the supporting portion is formed by an artificial process. Therefore, the radius of curvature of the tip portion of the probe 138 depends on the step of forming the side face 144 on the supporting portion side. The side face 144 is defined by the etching surface 126 of the probe forming portion 122 produced in the step shown in FIG. 4.

Figure 13:
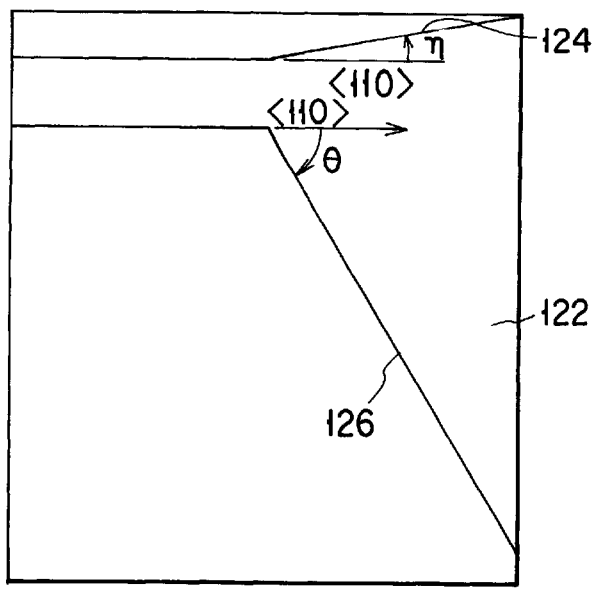
FIG. 13 shows a shape of a probe forming portion obtained in the step shown in FIG. 4.

As shown in FIG. 13, the etching surface 126 of the probe forming portion 122 formed in the step shown in FIG. 4 is flat, and formed by photolithography and dry etching. Therefore, the roughness of the etching surface 126, resulting from the dry etching, determines the radius of curvature of the tip portion of the probe 138.

Figure 14:
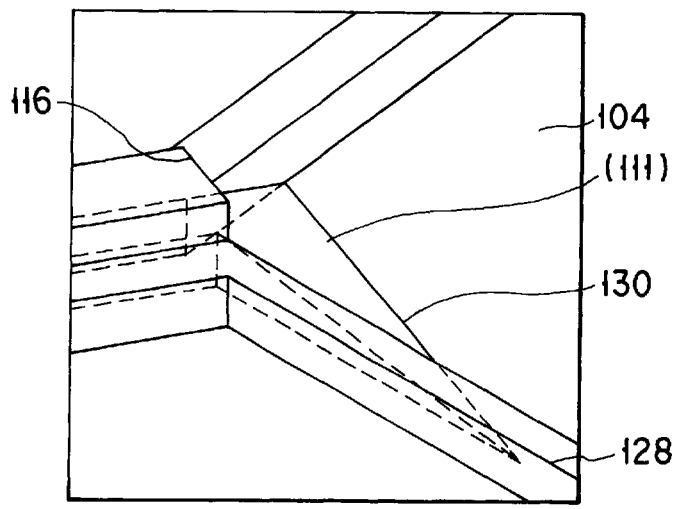
FIG. 14 shows a probe base portion obtained in the step shown in FIG. 6 based on the probe forming portion having the shape shown in FIG. 13.

In general, the roughness of a surface, resulting from dry etching, is 10 nm or less. Therefore, when the probe base portion 130 is formed by exposing the (111) plane of silicon as shown in FIG. 14, the radius of curvature of the tip portion of the probe base portion 130 is already 10 nm or less. Thus, the probe base portion 130, obtained through the oxidation process later, is stably as sharp as the radius of curvature of 10 nm or less.

As shown in FIG. 13, the aspect ratio of the probe 138 is determined by the inclination θ of the etching surface 126 of the probe forming portion 122 with respect to the plane (parallel to the surface of the lever portion 140 formed later), which includes the <110> direction and perpendicular to the (100) plane. The inclination θ of the etching surface 126 of the probe forming portion 122 with respect to the plane including the <110> direction and perpendicular to the (100)

plane, i.e., the inclination θ of the etching surface 126 with respect to the lever portion 140, is a design parameter which may be selected by a person who fabricates a cantilever.

Therefore, although θ=70° is selected to form a probe 138 having a vertex angle of 20° in the above embodiment, a probe having a higher aspect ratio may be formed by selecting a greater value as θ.

In the step shown in FIG. 7, the probe base portion 130 is oxidized by a thermal diffusion furnace or the like. When the temperature in the oxidation is set to 900 to 1000° C., preferably 950° C., lower than the temperature at which a silicon oxide film is formed in the normal semiconductor process, a more sharpened probe 138 can be obtained (low-temperature thermal oxidation). This is because the growth speed of the silicon oxide film is lower near the tip portion of the probe 138. As a result, the thickness of the portion of silicon which is not oxidized, i.e., the portion which finally functions as a probe, is decreased toward the tip portion. Consequently, the radius of curvature of the tip portion is less than several nm.

In the cantilever 142, the tip portion of the probe 138 is located substantially just under the top of the free end of the lever portion 140 and deviated from the center axis of the lever portion 140. Therefore, in the case where a sample has a steep step, the sample can be measured by the SPM to the limit of the step.

In addition, since the tip of the probe 138 is located substantially just under the vertex of the free end of the lever portion 140, the tip of the probe 138 can be indirectly positioned to an appropriate point by positioning the vertex of the lever portion 140 on a reference. In many types of SPM in which a lever portion can be positioned with respect to a sample to be measured by means of, for example, an optical microscope, when the vertex of the lever portion is positioned to a point of the sample to be measured by the SPM, the tip of the probe is positioned above the point of the sample. Thus, when SPM measurement is performed by means of the cantilever 142, the probe can be easily positioned with respect to the sample.

As described before, the tip portion of the probe 138 is defined by the (111) and (100) planes of silicon and the face 144 which can be processed artificially. The face 144 is determined by the etching surface 126 of the probe forming portion 122. Moreover, the shape of the etching surface 126 may be selected freely. Therefore, it is possible to form a probe having a shape different from that of the probe 138 shown in FIG. 15.

Modifications of the etching surface and probes formed on the basis of the modifications will be described below.

Figure 16:
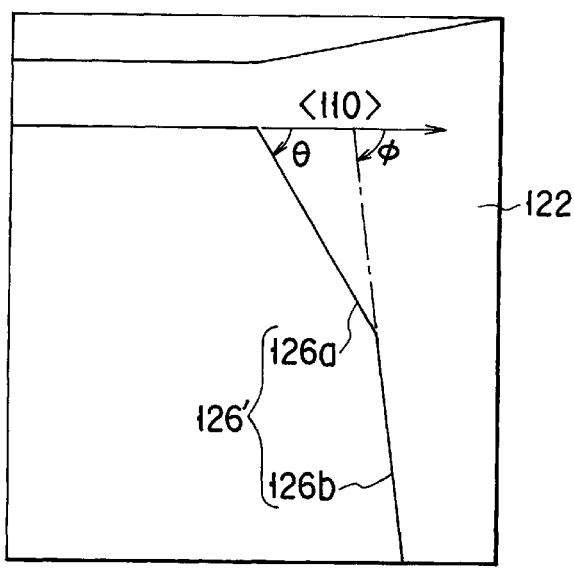
FIG. 16 shows a first modification of the probe forming portion obtained in the step shown in FIG. 4.

In a first modification, as shown in FIG. 16, an etching surface 126' of the probe forming portion 122 comprises a surface 126a having an inclination θ with respect to the plane including the <110> direction and perpendicular to the (100) plane and a surface 126b having an inclination φ (>0) with respect to the plane including the <110> direction and perpendicular to the (100) plane.

Figure 17:
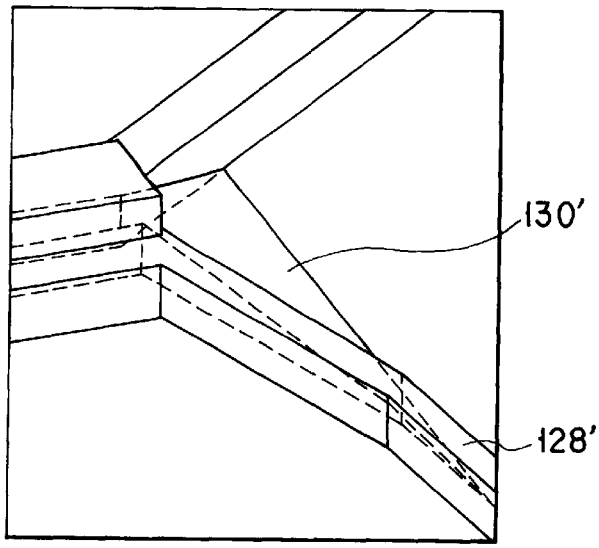
FIG. 17 shows a probe base portion obtained in the step shown in FIG. 6 based on the probe forming portion having the shape shown in FIG. 16.

When the fabrication method described above is applied to the etching surface 126' having this shape, a wall 128' made of silicon oxide bent in the middle portion is formed in accordance with the shape of the etching surface 126', as shown in FIG. 17. A probe base portion 130' comprises a truncated triangular pyramid, and a triangular pyramid connected thereto and having a higher aspect ratio.

Figure 18:
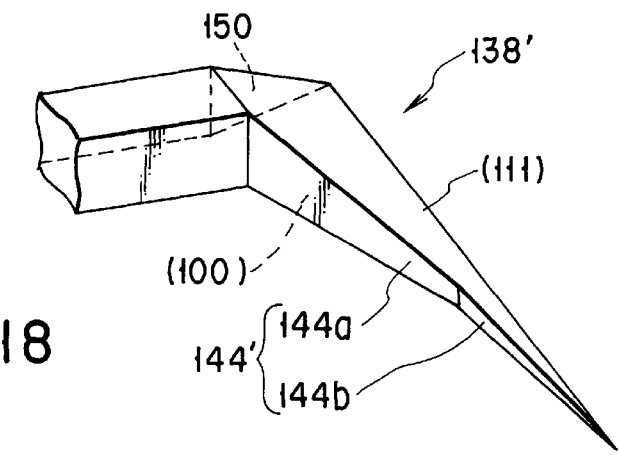
FIG. 18 shows a probe finally formed based on the probe base portion shown in FIG. 17.

As a result, as shown in FIG. 18, a probe 138' is obtained, which has a truncated triangular pyramid and a triangular pyramid connected thereto and having a higher aspect ratio.

The tip portion of the probe 138' is defined by the (111) and (100) planes of silicon and a face 144'. The face 144' comprises a face 144a having an inclination θ with respect to the plane including the <110> direction and perpendicular to the (100) plane and a face 144b having an inclination φ (>θ) with respect to the plane including the <110> direction and perpendicular to the (100) plane.

The probe 138' having the aforementioned shape can increase the aspect ratio and the height dimension of the tip portion without reducing the rigidity and strength of the probe as a whole.

In the probe 138 of a simple triangular pyramid as shown in FIG. 15, if the inclination θ is increased to increase the aspect ratio and the height dimension of the tip portion, the rigidity and strength of the probe as a whole are inevitably reduced. Accordingly, the aspect ratio and the height dimension of the tip portion of the probe 138 have limits determined by the purpose of use of the probe and the rigidity and strength of the material (single crystal silicon).

In contrast, in the probe 138' shown in FIG. 18, a portion of the truncated triangular pyramid (including the face 144a) near the lever portion 140 has satisfactory strength. For this reason, even if the aspect ratio of the second triangular pyramid is increased, the strength of the probe as a whole is not reduced very much. Therefore, the upper limits of the aspect ratio and the height dimension of the probe 138' actually realizable are higher than those of the probe 138 shown in FIG. 15.

Figure 19:
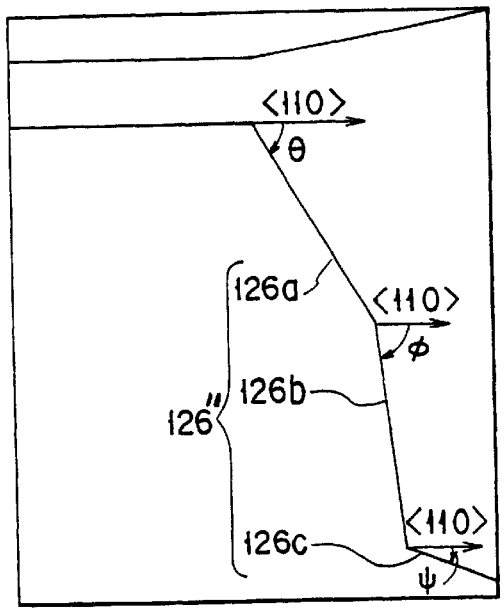
FIG. 19 shows a second modification of the probe forming portion obtained in the step shown in FIG. 4.
Figure 20:
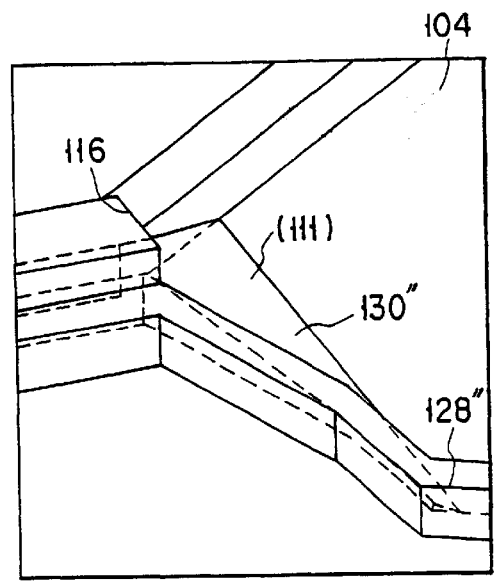
FIG. 20 shows a probe base portion obtained in the step shown in FIG. 6 based on the probe forming portion having the shape shown in FIG. 19.

According to a second modification, as shown in FIG. 19, an etching surface 126" of the probe forming portion 122 comprises a surface 126a having an inclination θ with respect to the plane including the <110> direction and perpendicular to the (100) plane, a surface 126b having an inclination φ (>0) with respect to the plane including the <110> direction and perpendicular to the (100) plane, and a surface 126c having an inclination φ (<0) with respect to the plane including the <110> direction and perpendicular to the (100) plane.

When the fabrication method described above is applied to the etching surface 126" having this shape, a wall 128" made of silicon oxide bent at two portions is formed in accordance with the shape of the etching surface 126". A probe base portion 130" comprises a truncated triangular pyramid, and an obliquely truncated triangular pyramid connected thereto and having a higher aspect ratio.

Figure 21:
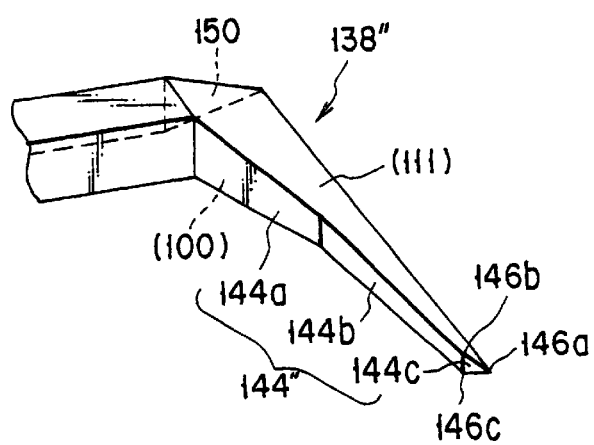
FIG. 21 shows a probe finally formed based on the probe base portion shown in FIG. 20.

As a result, as shown in FIG. 21, a probe 138" is obtained, which has a truncated triangular pyramid, and an obliquely truncated triangular pyramid connected thereto and having a higher aspect ratio. The tip portion of the probe 138" is defined by the (111) and (100) planes of silicon and a face 144". The face 144" comprises a face 144a having an inclination θ with respect to the plane including the <110> direction and perpendicular to the (100) plane, a face 144b having an inclination φ (>θ) with respect to the plane including the <110> direction and perpendicular to the (100) plane, and a face 144c having an inclination φ (<θ) with respect to the plane including the <110> direction and perpendicular to the (100) plane.

Since the probe 138" of this modification has three vertexes 146a, 146b, and 146c near the top end thereof, it is particularly suitable for measurement of a vertical wall or the bottom of a groove. A canti-lever suitable for measurement of a wall or bottom of a deep groove can be obtained by increasing the inclination φ of the face 144b and the length thereof.

Figure 22A:
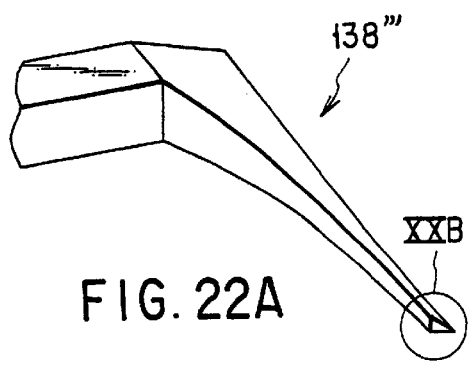
Figure 22B:
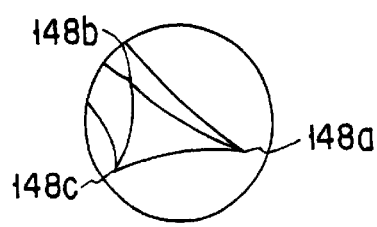

In the step shown in FIG. 7, the probe base portion 130" is oxidized at a temperature of 900 to 1000° C., preferably 905° C., with the result that a probe 138''' as shown in FIGS. 22A and 22B having more sharpened vertexes 148a, 148b, and 148c can be obtained.

Since the probe 138''' of this modification has three sharp vertexes 148a, 148b, and 148c near the top end thereof, it is particularly suitable for measurement of a vertical wall or the bottom of a groove.

As described above, according to the fabrication method of this embodiment, a cantilever for use in an SPM having a probe, wherein the tip thereof has a small radius of curvature, can be obtained easily and stably. Therefore, a cantilever for use in SPM, which allows SPM measurement with higher resolution, is provided.

Further, since similar probes for cantilevers of various properties can be fabricated accurately and stably, degradation of resolution, due to a difference between SPM methods, can be eliminated. Thus, a cantilever for use in SPM, which allows SPM measurement with higher resolution, is provided.

Furthermore, a cantilever for use in SPM having a probe of a high aspect ratio can be fabricated easily and stably. Accordingly, a cantilever for use in SPM, which allows SPM measurement with higher resolution, is provided. Such a cantilever having a prove of a high aspect ratio is suitable for SPM measurement for measuring a sample which has a high step, such as a groove of an optical disk.

The cantilever 142, fabricated by the aforementioned method, has a surface 150 inclined with respect to the surface 152 of the lever portion 140 on the rear side of the probe 138 (the side opposite to the tip). The surface 150 is defined by the etching surface 124 of the probe forming portion 122 formed in the step shown in FIG. 4. As shown in FIG. 13, the etching surface 124 is formed by photolithography and dry etching. Therefore, a person who fabricates the cantilever can select a suitable inclination η with respect to a plane including the <110> direction and perpendicular to the (100) plane.

In general, the surface 152 of the lever portion 140 is used as a reflection surface of an optical sensor for detecting movement of the lever portion 140. Instead, however, the surface 150 may be used for this purpose. In other words, the cantilever 142 has two reflection surfaces available in optical detection.

Further, it is possible that sensors are respectively provided for the two reflection surfaces 150 and 152, so that the sensors are used in different SPM measurement to detect different information separately. For example, displacement of the tip of the probe in the Z direction is detected by using the reflection surface 150 on the rear side of the probe 138, while the angle of twist of the lever portion 140 is detected by using the reflection surface 152 of the lever portion 140.

A step of coating the surface 152 of the lever and the surface 150 of the rear side of the probe 138 with metal film may be added to the aforementioned fabrication process (the steps shown in FIGS. 1 to 10), in order to improve the reflectivity of the surfaces 152 and 150.

Figure 23:
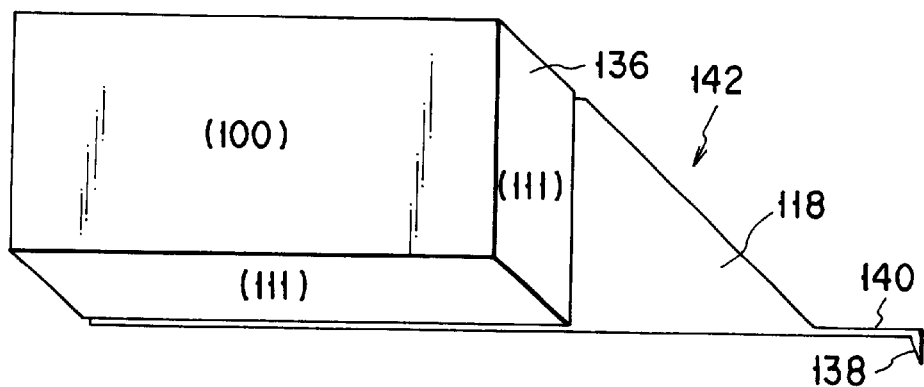
FIG. 23 shows a cantilever obtained by the fabrication method according to the embodiment of the present invention, wherein the second supporting portion is a parallelepiped.

In this embodiment, since the etching mask 110 for forming the second supporting portion 136 is rectangular, the second supporting portion 136 in the finished cantilever 142 is a parallelepiped, as shown in FIG. 23.

The shape of the second supporting portion 136 depends on the etching mask 110 formed in the step shown in FIG. 2. Therefore, the shape of the second supporting portion 136 can be changed by modifying the shape of the etching mask 110. For example, as shown in FIG. 24, it can be changed to a second supporting portion 136' which supports the overall surface of the first supporting portion 118.

Figure 24:
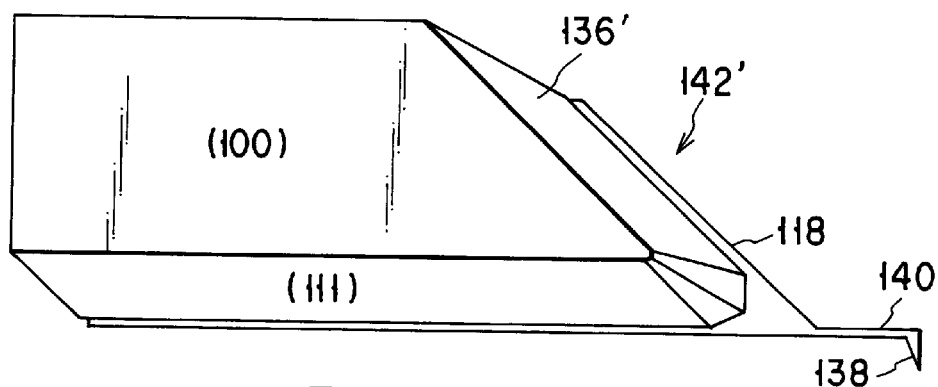
FIG. 24 shows a cantilever obtained by modifying the shape of the etching mask for forming the second supporting portion in the step shown in FIG. 2, wherein the second supporting portion is similar to a parallelepiped and supports substantially all region of a first supporting portion.

The cantilever 142' shown in FIG. 24 is suitable for SPM measurement in which the cantilever is vibrated. The portions other than the lever portion 140 are prevented from vibration, since the second supporting portion 136' extends near the lever portion 140 and therefore the rigidity of the first supporting portion 118, particularly the portion near the lever portion 140, is increased.

Further, the relationship in shape between the first supporting portion 118 and the lever portion 140 is determined by the patterning of the silicon nitride film 116 formed in the step shown in FIG. 4. Therefore, the relationship in shape between the first supporting portion 118 and the lever portion 140 can be changed by modifying the patterning of the silicon nitride film 116. For example, as shown in FIG. 25, the surface of the lever portion 140 may be inclined at an angle δ with the bottom surface of the first supporting portion 118.

Figure 25:
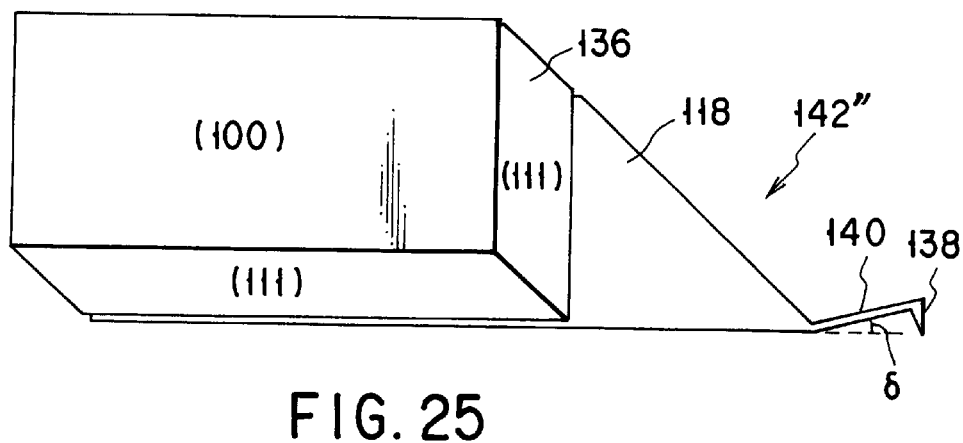
FIG. 25 shows a cantilever obtained by modifying the patterning of the silicon nitride film in the step shown in FIG. 4, wherein the surface of a lever portion is inclined with respect to the bottom surface of the first supporting portion.

The cantilever 142", shown in FIG. 25, assures a wider space between the second supporting portion 136 and a sample as compared to the cantilever 142 shown in FIG. 23. More specifically, when the cantilever 142" and the cantilever 142 are attached to the scanning probe microscope such that the probes 138 thereof are in the same position relative to a sample, the second supporting portion 136 of the cantilever 142" (FIG. 25) is located farther from the sample than the second supporting portion 136 of the cantilever 142 (FIG. 23).

Cantilever holding mechanisms for holding the cantilevers shown in FIGS. 23 to 25 will now be described. Since all cantilever holding mechanisms described below support the cantilevers shown in FIGS. 23 to 25 in the same manner, a cantilever holding mechanism for holding the cantilever 142 shown in FIG. 23 will be described as a representative.

A cantilever holding mechanism 170 shown in FIG. 26 has a holder body 172, which includes a groove 174 of a shape corresponding to the shape of the second supporting portion 136 of the cantilever 142. The mechanism 170 also has a plate spring 176 fixed to the holder body 172 and extending over the groove 174.

In the cantilever holding mechanism 170, the second supporting portion 136 of the cantilever 142 is inserted in the groove 174 formed in the holder body 172. The spring plate 176 provided on a side of the holder body 172 is brought into contact with the first supporting portion 118 of the cantilever 142, and presses the attachment surface of the second supporting portion 136 against the bottom surface of the groove 174. As a result, the cantilever 142 is held by the mechanism. In this specification, the attachment surface means the surface of the second supporting portion 136 which is opposite to the surface for supporting the first supporting portion 118. In FIG. 23, the (110) plane surrounded by the (111) planes corresponds to the attachment surface. Such a surface is hereinafter referred to as an attachment surface.

In the cantilever holding mechanism 170 described above, the plate spring 176 for pressing the cantilever 142 is attached on the side of the holder body 172, and no member is provided on the bottom surface of the holder body 172, which faces a sample. Therefore, a comparatively large space can be maintained between the sample and the holding mechanism. Moreover, the shape and size of the plate spring 176 are not restricted for the purpose of assuring the space between the sample and the holding mechanism. Therefore, the thickness and shape of the plate spring 176 can be changed comparatively freely, so that the cantilever 142 can be held more firmly.

A cantilever holding mechanism 170' shown in FIG. 27 has a holder body 172' which includes a groove 174 of a shape corresponding to the shape of the second supporting portion 136 of the cantilever 142. A vacuum chuck hole 178 is formed in the bottom surface of the groove 174. The hole 178 is connected to a suction apparatus 179.

In the cantilever holding mechanism 170', the second supporting portion 136 of the cantilever 142 is inserted in the groove 174 formed in the holder body 172'. The attachment surface of the second supporting portion 136 of the cantilever 142 is sucked through the hole 178, thereby supporting the cantilever 142.

The holder body 172' of the cantilever holding mechanism 170' does not have any member for supporting the cantilever 142. Therefore, a comparatively large space can be maintained between the sample and the holding mechanism. Further, the force of supporting the cantilever 142 can be increased comparatively freely by increasing the suction force of the suction apparatus 179.

A cantilever holding mechanism 170" shown in FIG. 28 has a holder body 172", which includes a groove 174 of a shape corresponding to the shape of the second supporting portion 136 of the cantilever 142. It also has a plate spring 176 fixed to the holder body 172" and extending over the groove 174, and a piezoelectric element 180 fixed to the holder body 172".

In the cantilever supporting mechanism 170", the second supporting portion 136 of the cantilever 142 is inserted in the groove 174 formed in the holder body 172". The spring plate 176 provided on a side of the holder body 172" is brought into contact with the first supporting portion 118 of the cantilever 142, and presses the attachment surface of the second supporting portion 136 against the bottom surface of the groove 174. As a result, the cantilever 142 is held by the mechanism.

The piezoelectric element 180 is provided for the purpose of SPM measurement in a vibration mode, in which the lever portion 140 of the cantilever 142 is vibrated. It is vibrated upon receipt of an AC voltage from a power source (not shown), and applies the vibration to the lever portion 140 of the cantilever 142.

In the cantilever holding mechanism 170", since the plate spring 176 for pressing the cantilever 142 is attached on the side of the holder body 172", a comparatively large space can be maintained between the sample and the holding mechanism. Therefore, the shape and size of the plate spring 176 can be changed comparatively freely, so that the cantilever 142 can be held more firmly.

Figure 29:
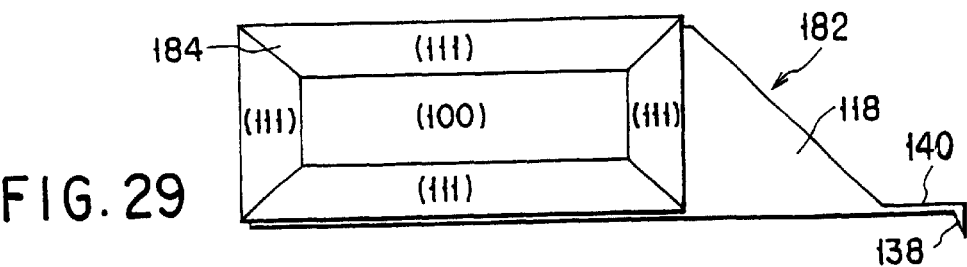
FIG. 29 shows a cantilever obtained by modifying the shape of the etching mask for forming the second supporting portion in the step shown in FIG. 2, wherein the second supporting portion is a prismoid.
Figure 30:
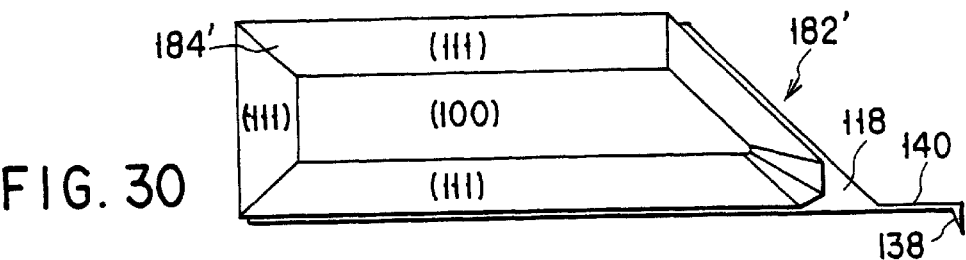
FIG. 30 shows a cantilever obtained by modifying the shape of the etching mask for forming the second supporting portion in the step shown in FIG. 2, wherein the second supporting portion is similar to a prismoid and supports substantially all region of a first supporting portion.

FIGS. 29 and 30 show cantilevers having second supporting portions of different shapes from those described above, and FIGS. 31 and 32 show cantilever holding mechanisms for holding them.

A cantilever 182 shown in FIG. 29 has a second supporting portion 184 having the shape of a prismoid. To obtain the second supporting portion 184 of this shape, it is only necessary that the etching mask 110 used in the step shown in FIG. 2 be smaller than a region of the silicon nitride film 116 which forms the first supporting portion, and that the mask be placed at a central portion of the region. With this mask, in the anisotropic etching in the step shown in FIG. 9, the silicon substrate is etched to expose four (111) planes on the side of the etching mask 110. As a result, the second supporting portion 184 is shaped as a prismoid.

If a trapezoidal etching mask 110 is used in the step shown in FIG. 2, a cantilever 182' as shown in FIG. 30, which has a second supporting portion 184' for supporting the overall surface of the first supporting portion 118, can be formed. As well as the cantilever 142' shown in FIG. 24, the cantilever 182' is suitable for SPM measurement in which the cantilever is vibrated.

Since both cantilever holding mechanisms shown in FIGS. 31 and 32 hold the cantilevers shown in FIGS. 29 and 30 in the same manner, the cantilever holding mechanism for holding the cantilever 142 shown in FIG. 29 will be described below as a representative.

Figure 31:
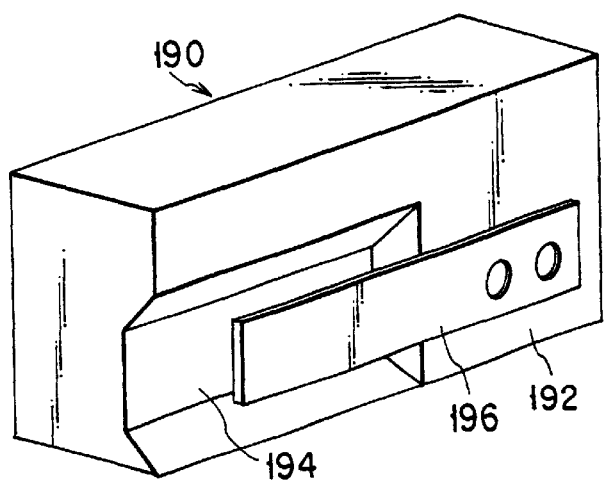
FIG. 31 shows a cantilever holding mechanism for holding the cantilever shown in FIGS. 29 and 30.

A cantilever holding mechanism 190 shown in FIG. 31 has a holder body 192, which includes a groove 194 of a shape corresponding to the shape of the second supporting portion 184 of the cantilever 182. The mechanism 190 also has a plate spring 196 fixed to the holder body 192 and extending over the groove 194.

In the cantilever holding mechanism 190, the second supporting portion 184 of the cantilever 182 is inserted in the groove 194 formed in the holder body 192. The spring plate 196 provided on a side of the holder body 192 is brought into contact with the first supporting portion 118 of the cantilever 182, and presses the attachment surface of the second supporting portion 184 against the bottom surface of the groove 194. As a result, the cantilever 182 is held by the mechanism 190.

In the cantilever holding mechanism 190 described above, since the plate spring 196 for pressing the cantilever 182 is attached on the side of the holder body 192, a comparatively large space can be maintained between the sample and the holding mechanism. Further, the shape and size of the plate spring 196 can be changed comparatively freely, so that the cantilever 142 can be held more firmly.

Figure 32:
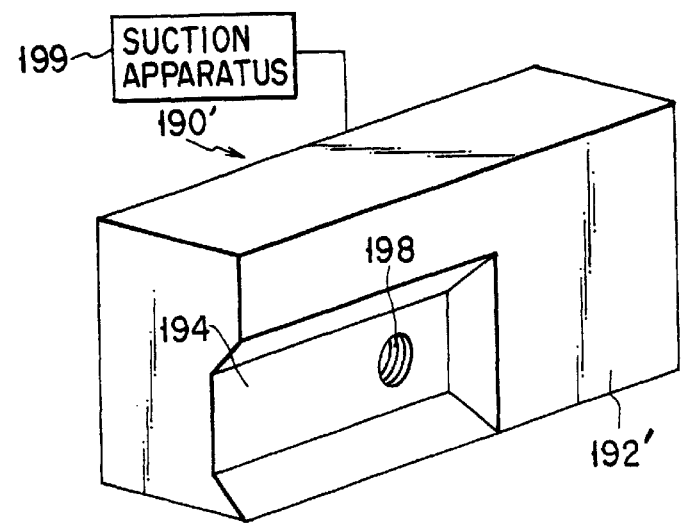
FIG. 32 shows another cantilever holding mechanism for holding the cantilever shown in FIGS. 29 and 30.

A cantilever holding mechanism 190' shown in FIG. 32 has a holder body 192' which includes a groove 194 of a shape corresponding to the shape of the second supporting portion 184 of the cantilever 182. A vacuum chuck hole 198 is formed in the bottom surface of the groove 194. The hole 198 is connected to a suction a apparatus 199.

In the cantilever holding mechanism 190', the second supporting portion 184 of the cantilever 182 is inserted in the groove 194 formed in the holder body 192'. The attachment surface of the second supporting portion 184 of the cantilever 182 is sucked through the hole 198, thereby supporting the cantilever 182.

The holder 192' of the cantilever holding mechanism 190' does not have any member for supporting the cantilever 182. Therefore, a comparatively large space can be maintained between the sample and the holding mechanism. Further, the piezoelectric element 180 shown in FIG. 28 may be added to the holding mechanisms 190 and 190' shown in FIGS. 31 and 32.

A cantilever particularly suitable to measure a vertical wall can be formed by applying the fabrication method described above. Another method for fabricating such a cantilever will be described below.

In the cantilever fabricated by the method described above, the shape of the probe is defined by two crystal faces of silicon, i.e., the surfaces (111) and (110), and two surfaces obtained by the artificial processes. If the two surfaces formed by the artificial processes are changed, a cantilever having a probe particularly suitable to measure a vertical wall, which has a completely different shape as those of the aforementioned can, be formed.

Figure 33:
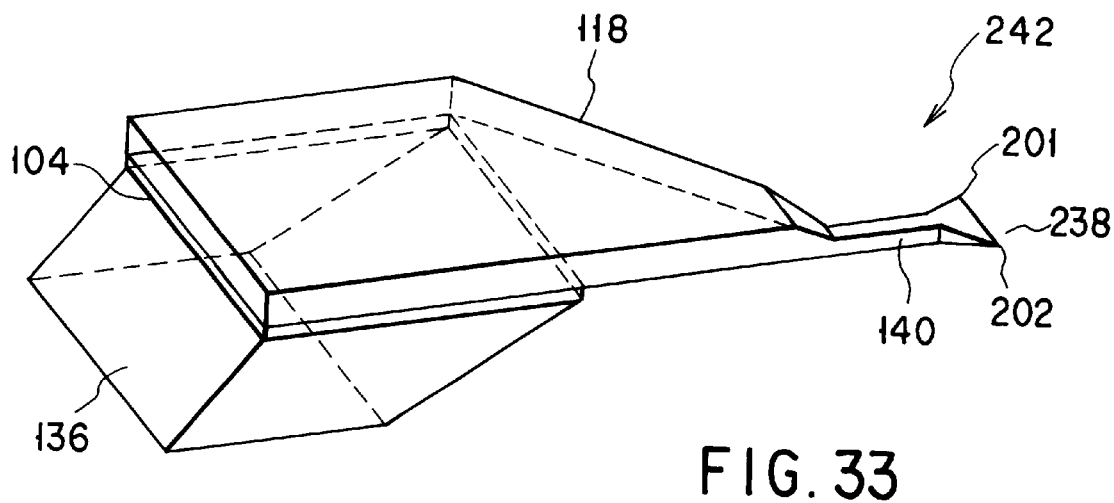
FIG. 33 shows a cantilever obtained by modifying the patterning of the silicon nitride film in the step shown in FIG. 4, wherein the cantilever is particularly suitable for measuring a vertical wall.

FIG. 33 shows a cantilever having a probe suitable to measure a vertical wall. In FIG. 33, the same elements as those described before are identified by the same reference numerals as used in the preceding drawings.

As shown in FIG. 33, a cantilever 242 has a probe 238 having a pair of end points 201 and 202 located on sides of the axis of the lever portion 140. In other words, the cantilever 242 has a probe 238 including a pair of triangular pyramidal projections symmetrically projected leftward and rightward from the lever portion extending direction, when viewed from the side of the proximal end portion of the lever portion 140 along the direction of the (100) plane.

Figure 34:
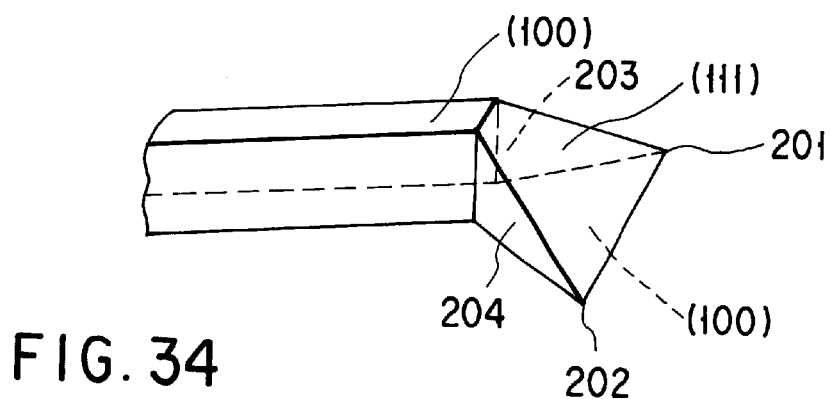
FIG. 34 shows in an enlarged view of the probe of the cantilever shown in FIG. 33.

As shown in FIG. 34, one of the symmetric projections of the probe 238 is defined by two crystal faces crossing each other, i.e., the (111) and (100) planes, and a surface 203 formed by an artificial process. The end point 201 is an intersection of the three surfaces: the (111) and (100) planes and the surface 203. Similarly, the other projection of the probe 238 is defined by two crystal faces crossing each other, i.e., the (111) and (100) planes, and a surface 204 formed by an artificial process. The end point 202 is an intersection of the three surfaces: the (111) and (100) planes and the surface 204.

Figure 36:
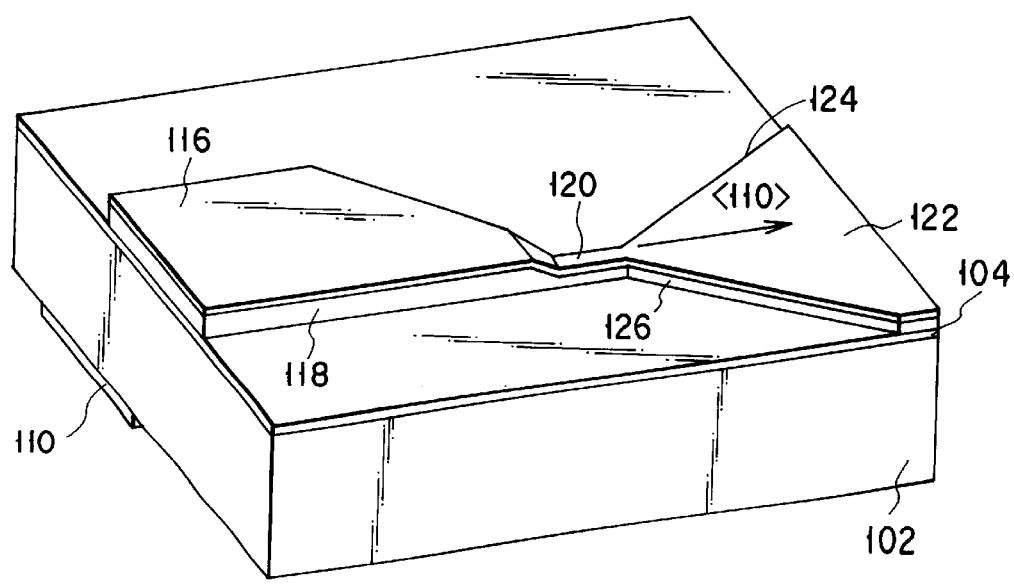
FIG. 36 shows a probe forming portion obtained by pattering of a silicon nitride film modified to fabricate the cantilever shown in FIG. 33.

The surfaces 203 and 204 formed by an artificial process are respectively defined by the etching surfaces 126 and 124 of the probe forming portion 122 formed in the step shown in FIG. 4. Thus, the cantilever 242 having such a probe 238 can be fabricated by the same process for fabricating the cantilever described above with reference to FIGS. 1 to 10, except that the patterning of the silicon nitride film 116 in the step shown in FIG. 4 is changed. FIG. 36, corresponding to FIG. 4, shows a probe forming portion processed by another patterning of the silicon nitrate film 116, which is modified to fabricate the cantilever 242 having the probe 238.

More specifically, in the step shown in FIG. 4, a pattern of the silicon nitride film 116, different from that used in fabricating the cantilever described above, is used as a mask. The second silicon substrate (active layer) 106 is selectively etched using the different pattern as a mask, until the intermediate silicon oxide film 104 of the SOI substrate 108 is exposed, thereby forming a first supporting portion 118, a lever base portion 120, i.e., the base material of a lever portion, and a probe forming portion 122, i.e., the base material of a probe, as shown in FIG. 36. At the same time, the etching surfaces 124 and 126 of the probe forming portion 122 are formed to the be inclined at the same angle with respect to a plane including the <110> direction and perpendicular to the (100) plane.

Subsequently, applying the steps shown in FIGS. 5 to 10, the cantilever 242 shown in FIG. 33 is produced, which includes the probe 238 having two end points 201 and 202 at its tip portion.

Figure 35:
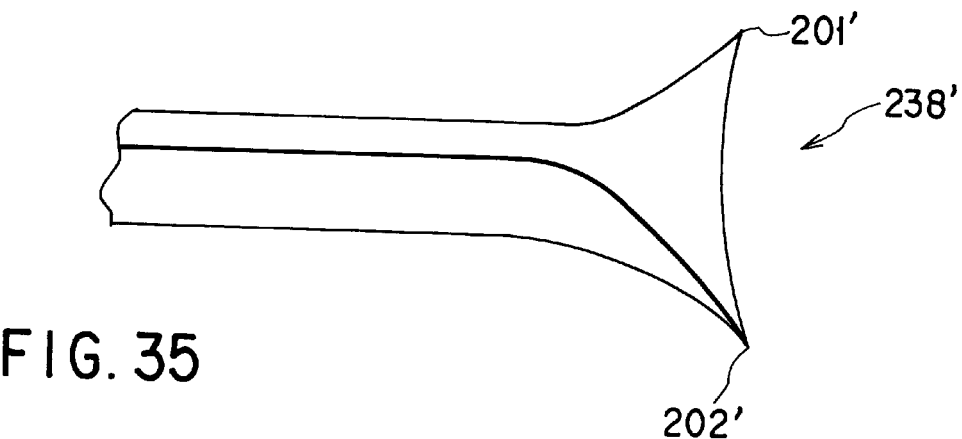
FIG. 35 shows a probe formed by subjecting the probe base portion shown in FIG. 34 to a low-temperature thermal oxidation process.

In the step shown in FIG. 7, if the probe base portion is oxidized at a temperature of 900 to 1000° C., preferably 950° C., a probe 238' having more sharpened end points 201' and 202', as shown in FIG. 35, can be obtained.

In the cantilever 242, the probe 238 has the pair of end points 201 (201') and 202 (202') projected from the sides of the axis of the lever portion 140, i.e., projected from the upper and lower surfaces of the lever portion 140. Therefore, as shown in FIG. 37, the cantilever 242 is suitable to measure a vertical wall in particular.

Figure 37:
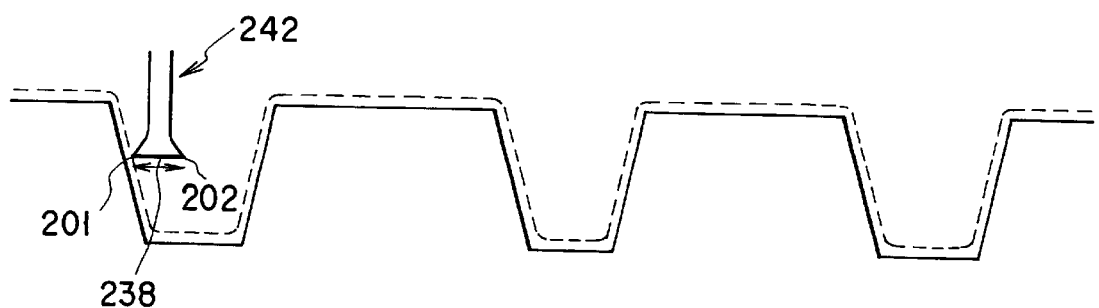
FIG. 37 shows a state of measuring a vertical wall by means of the cantilever shown in FIG. 33.

FIG. 37 shows a state of measuring a vertical wall by means of the cantilever 242. The measurement is performed with the cantilever 242 vibrated in directions along an edge line connecting the two end points 201 (201') and 202 (202') of the probe 238.

The present invention is not limited to the embodiment described above, but includes all embodiments within the spirit or scope of the gist of the invention.

For example, the cantilever holding mechanism of the embodiment may be attached to a conventional apparatus as described in the following publication.

Jpn. Pat. Appln. KOKAI Publication No. 9-15250 discloses an apparatus comprising a cantilever formed integrally with a cantilever supporting portion, a cantilever holding mechanism (cantilever holder) for holding the cantilever supporting portion, a scanner an end of which is fixed to an SPM apparatus body, and a displacement detecting sensor of an optical lever system connected to the other end of the scanner. The contents of this publication are incorporated herein by reference.

In this structure, the cantilever is detachably attached to not only the cantilever holding mechanism but also the displacement detecting sensor. The cantilever and the holding mechanism of the present invention can be attached to the displacement detecting sensor in accordance with the type of measurement.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cantilever for use in a scanning probe microscope including a lever portion having a probe portion made of silicon, wherein the probe portion is triangular or substantially triangular pyramid shaped having three side faces, two of which are made of crystal and a remaining one of which is formed by an artificial process, wherein the two crystal faces are (100) and (111) planes, and the lever portion comprises a surface, which is provided with the probe portion, and is selected to be substantially perpendicular to the (100) and (111) planes.

2. The cantilever for use in a scanning probe microscope according to claim 1, wherein the lever portion comprises a surface, which is provided with the probe portion, and the remaining one of the side faces of the probe portion is made of a first plane having an inclination θ with respect to the surface of the lever portion, and a second plane having an inclination φ (>θ) with respect to the surface of the lever portion.

3. The cantilever for use in a scanning probe microscope according to claim 1, wherein the probe is sharpened by thermal oxidation.

4. The cantilever for use in a scanning probe microscope according to claim 1, wherein the remaining one of the side faces of the probe portion is made of a plane having an inclination θ with respect to the surface of the lever portion, on which the probe portion is formed.

5. The cantilever for use in a scanning probe microscope according to claim 1, wherein the remaining one of the side faces of the probe portion is made of a first plane having an inclination θ with respect to the surface of the lever portion, on which the probe portion is formed, and a second plane having an inclination φ (>θ) with respect to the surface of the lever portion, on which the probe portion is formed.

6. The cantilever for use in a scanning probe microscope according to claim 1, wherein the lever portion comprises a surface, which is provided with the probe portion, and the remaining one of the side faces of the probe portion is made of a first plane having an inclination θ with respect to the surface of the lever portion, a second plane having an inclination φ (>θ) with respect to the surface of the lever portion, and a third plane having an inclination φ (<θ) with respect to the surface of the lever portion.

7. A cantilever for use in a scanning probe microscope including a lever portion having a probe portion made of silicon, wherein the probe portion is triangular or substantially triangular pyramid shaped having three side faces, two of which are made of crystal and a remaining one of which is formed by an artificial process, wherein the lever portion comprises a surface, which is provided with the probe portion, the remaining one of the side faces of the probe portion is made of a plane having an inclination θ with respect to the surface of the lever portion.

8. The cantilever for use in a scanning probe microscope according to claim 7, wherein the probe is sharpened by thermal oxidation.

* * * * *